(12) United States Patent
Arashi et al.

(10) Patent No.: US 7,655,588 B2
(45) Date of Patent: Feb. 2, 2010

(54) DIELECTRIC PORCELAIN COMPOSITION AND METHOD FOR PRODUCTION THEREOF

(75) Inventors: Tomohiro Arashi, Tokyo (JP); Yasuharu Miyauchi, Tokyo (JP)

(73) Assignee: TDK Corporation, Tokyo (JP)

( * ) Notice: Subject to any disclaimer, the term of this patent is extended or adjusted under 35 U.S.C. 154(b) by 246 days.

(21) Appl. No.: 11/659,019

(22) PCT Filed: Mar. 14, 2006

(86) PCT No.: PCT/JP2006/305477

§ 371 (c)(1),
(2), (4) Date: Jan. 31, 2007

(87) PCT Pub. No.: WO2006/098462

PCT Pub. Date: Sep. 21, 2006

(65) Prior Publication Data

US 2009/0011921 A1    Jan. 8, 2009

(30) Foreign Application Priority Data

Mar. 18, 2005  (JP) ............................. 2005-079368
Mar. 8, 2006   (JP) ............................. 2006-062334

(51) Int. Cl.
*C04B 35/468* (2006.01)

(52) U.S. Cl. ...................................... 501/139; 501/138

(58) Field of Classification Search ................. 501/139, 501/138
See application file for complete search history.

(56) References Cited

U.S. PATENT DOCUMENTS

| 6,458,734 | B1 * | 10/2002 | Sugimoto et al. | ............ 501/139 |
| 6,602,616 | B2 * | 8/2003 | Sugimoto et al. | ............ 428/688 |
| 2007/0213202 | A1 * | 9/2007 | Arashi et al. | ................ 501/138 |

FOREIGN PATENT DOCUMENTS

| JP | 2001 31468 | 2/2001 |
| JP | 2002 104870 | 4/2002 |
| JP | 2002 167274 | 6/2002 |

OTHER PUBLICATIONS

U.S. Appl. No. 11/573,282, filed Feb. 6, 2007, Arashi, et al.

* cited by examiner

*Primary Examiner*—Karl E Group
(74) *Attorney, Agent, or Firm*—Oblon, Spivak, McClelland, Maier & Neustadt, L.L.P.

(57) ABSTRACT

A dielectric porcelain composition here contains as main components BaO, $Nd_2O_3$, $TiO_2$, MgO and $SiO_2$ at the given ratios and as subordinate components ZnO, $B_2O_3$, CuO and an alkaline earth metal oxide RO (R: an alkaline earth metal) at given ratios, preferably with the addition of Ag as an optional subordinate component, so that it can have low-temperature sintering capability stable and reliable enough to permit a conductor formed of Ag, an alloy containing Ag as a main component or the like to be used as an internal conductor.

8 Claims, 6 Drawing Sheets

DIELECTRIC PORCELAIN COMPOSITION AND METHOD FOR PRODUCTION THEREOF

This application is a 371 of PCT/JP2006/305477, filed Mar. 14, 2006.

TECHNICAL ART

The present invention relates to a dielectric porcelain composition having low-temperature sintering capability enough to allow a conductor formed of Ag, an alloy composed mainly of Ag or the like to be used as an internal conductor.

BACKGROUND ART

In recent years, mobile communications fields represented by car phones and cell phones have seen some drastic growth. And then, high-frequency bands referred to as the so-called quasi-microwaves of the order of several hundred MHz to a few GHz are used for those mobile communications. In electronic devices used with mobile communications equipment, like resonators, filters and capacitors, too, high-frequency characteristics are thus of importance.

Important factors for the recent widespread use of mobile communications are, to say nothing of more sophisticated services, size and cost reductions of communications equipment. This in turn leads to the need of reducing the size and cost of associated high-frequency devices. For instance, to achieve size reductions in terms of resonator material, there are dielectric porcelain compositions required, which have a high specific dielectric constant and limited dielectric losses at the frequency used, and which are reduced in changes in the temperature characteristics of resonance frequency.

For materials for high-frequency devices that meet such demands, there have been BaO-rare earth oxide-$TiO_2$ base dielectric porcelain compositions known so far in the art.

Now, to downsize high-frequency devices, there are surface mount devices (SMDs for short) going mainstream, which each have conductors such as electrodes and wirings. In what follows, a conductor such as an electrode or wiring built in a high-frequency device will be called an "internal conductor".

To form conductors such as electrodes or wirings in the device, it is required that a dielectric porcelain composition be co-fired with them. Of a BaO-rare earth oxide-$TiO_2$ base dielectric porcelain composition, however, the firing temperature is relatively high, say, 1,300 to 1,400° C., and materials for conductors such as electrodes or wirings, used in combination with it, have been limited to noble metals such as palladium (Pd) and platinum (Pt) that can stand up to high temperatures.

Because those noble metals cost much, however, it is desired for the purpose of making devices less expensive that low-resistance yet less expensive conductors such as Ag or Cu can be used as the internal conductors.

To this end, there has been a technique proposed, in which subordinate components such as $B_2O_3$ are added to a material composed mainly of a BaO-rare earth oxide-$TiO_2$ system. With that technique, a dielectric porcelain composition can be fired at a temperature lower than the melting point of a conductor such as Ag or Cu, so that the conductor such as Ag or Cu can be co-fired in the form of an internal conductor (see, for instance, JP-A's 2001-31468 and 6-40767).

To achieve further size reductions of devices, on the other hand, there has been a multilayer type device of high performance proposed, in which a dielectric porcelain composition having a high specific dielectric constant is joined to a dielectric porcelain composition having a low dielectric constant, thereby forming a plurality of high-frequency devices as one integral piece (see, for instance, JP-A 9-139320).

However, if, in forming such a multilayer type device, the dielectric porcelain composition having a high specific dielectric constant differs in properties from that having a low dielectric constant, defects will occur at a interface of both upon firing, because the shrinkage behaviors and linear thermal coefficients of both do not match.

In view of such considerations, it is desired that for multilayer type device formation, the dielectric porcelain composition having a high specific dielectric constant and the dielectric porcelain composition having a low specific dielectric constant be basically made up of the same or a similar material having much the same physical properties.

However, the BaO-rare earth oxide-$TiO_2$ base dielectric porcelain composition well fit for the material of a small high-frequency device has a much higher specific dielectric constant, as set forth in the aforesaid patent publication 1, and even with simple addition of subordinate components, it would be difficult to produce a BaO-rare earth oxide-$TiO_2$ base dielectric porcelain composition that has a low specific dielectric constant as demanded for a composite arrangement (multilayer type device).

To fabricate a multilayer type device having limited power losses for high-frequency purposes, there are also growing expectations of a BaO-rare earth oxide-$TiO_2$ base dielectric porcelain composition that is much more improved in terms of dielectric losses than could be possible with the prior art.

DISCLOSURE OF THE INVENTION

Having been made in view of such situations, the present invention has for the object the provision of a dielectric porcelain composition and its production process, which allow even a composition system composed mainly of BaO, a rare earth oxide and $TiO_2$ to have more stable, more reliable low-temperature sintering capability, thereby ensuring that a conductor formed of Ag, an alloy composed mainly of Ag or the like can be used as an internal conductor.

Another object of the present invention is to provide a dielectric porcelain composition that is reduced in resonance frequency changes with temperature changes, and has a specific dielectric constant lower than that of a BaO-rare earth oxide-$TiO_2$ base dielectric porcelain composition as well as its production process.

To accomplish those objects, the present invention provides a dielectric porcelain composition that contains as a main component composition a component represented by a composition formula $\{\alpha(xBaO \cdot yNd_2O_3 \cdot zTiO_2) + \beta(2MgO \cdot SiO_2)\}$ wherein x, y and z indicative of a molar ratio of BaO, $Nd_2O_3$, and $TiO_2$ are in the ranges of $$9(\text{mol \%}) \leq x \leq 22(\text{mol \%})$$

$$9(\text{mol \%}) \leq y \leq 29(\text{mol \%})$$

$$61(\text{mol \%}) \leq z \leq 74(\text{mol \%})$$

and have a relation of x+y+z=100 (mol %), and $\alpha$ and $\beta$ indicative of a volume ratio of each component in said main component composition are in the ranges of $$15(\text{vol \%}) \leq \alpha \leq 75(\text{vol \%})$$

$$25(\text{vol \%}) \leq \beta \leq 85(\text{vol \%})$$

and have a relation of α+β=100 (vol %), wherein a zinc oxide, a boron oxide, a copper oxide and an alkaline earth metal oxide are contained as subordinate components relative to said main component composition, and when said subordinate components are represented by aZnO, bB$_2$O$_3$, cCuO and dRO (R is an alkaline earth metal), a, b, c and d indicative of a weight ratio of each subordinate component relative to said main component composition have relations of 0.1(wt %)≦a≦12.0(wt %)

0.1(wt %)≦b≦12.0(wt %)

0.1(wt %)≦c≦9.0(wt %)

0.2(wt %)≦d≦5.0(wt %)

In a preferable embodiment of the present invention, the alkaline earth metal R is at least one selected from the group consisting of Ba, Sr and Ca.

In a preferable embodiment of the present invention, the dielectric porcelain composition contains a forsterite (2MgO·SiO$_2$) crystal therein.

In a preferable embodiment of the present invention, Ag is contained as an additional subordinate component.

In a more preferable embodiment of the present invention, the weight ratio, eAg, of Ag relative to said main component composition is 0.3 (wt %)≦e≦3.0 (wt %).

In a preferable embodiment of the present invention, the dielectric porcelain composition has such a physical property as represented by a firing temperature of up to 870° C.

In a preferable embodiment of the present invention, the dielectric porcelain composition has such a physical property as represented by a specific dielectric constant of up to 50.

In a preferable embodiment of the present invention, the dielectric porcelain composition has such physical properties as represented by a specific dielectric constant of 20 to 40 and a Q·f value of at least 4,000 GHz.

The present invention also provides a dielectric porcelain composition production process in which a barium-containing raw material, a neodymium-containing raw material, a titanium-containing raw material, a magnesium-containing raw material, a silicon-containing raw material, a zinc-containing raw material, a boron-containing raw material, a copper-containing raw material and an alkaline earth metal-containing raw material are fired to produce a BaO—Nd$_2$O$_3$—TiO$_2$—MgO—SiO$_2$—ZnO—B$_2$O$_3$—CuO—RO (R is an alkaline earth metal) base dielectric porcelain composition, wherein forsterite (2MgO·SiO$_2$) powders are used as said magnesium-containing raw material and said silicon-containing raw material.

Further, the present invention provides a dielectric porcelain composition production process in which a mixture containing a barium-containing raw material, a neodymium-containing raw material, a titanium-containing raw material, a magnesium-containing raw material, a silicon-containing raw material, a zinc-containing raw material, a boron-containing raw material, a copper-containing raw material, an alkaline earth metal-containing raw material and silver (Ag) are fired to produce a BaO—Nd$_2$O$_3$—TiO$_2$—MgO—SiO$_2$—ZnO—B$_2$O$_3$—CuO—RO (R is an alkaline earth metal)-Ag base dielectric porcelain composition, wherein forsterite (2MgO·SiO$_2$) powders are used as said magnesium-containing raw material and said silicon-containing raw material.

Containing as main components BaO, Nd$_2$O$_3$, TiO$_2$, MgO and SiO$_2$ in given ratios and as subordinate components ZnO, B$_2$O$_3$ and CuO in given ratios and comprising an alkaline earth metal oxide RO (R: an alkaline earth metal), the dielectric porcelain composition of the present invention has more stable, more reliable low-temperature sintering capability so that a conductor formed of Ag, an alloy composed mainly of Ag or the like can be used as an internal conductor. In addition, it is possible to obtain a dielectric porcelain composition that has limited resonance frequency changes with temperature changes and a specific dielectric constant lower than that of a BaO-rare earth oxide-TiO$_2$ base dielectric porcelain composition and so is best suited for multilayer type device formation.

If, besides the aforesaid subordinate components, there is Ag added and contained as an additional subordinate component, then firing can be carried out at much lower temperatures, so that stable capacitance and insulation resistance value can be obtained even with firing at relatively low temperatures.

BEST MODE FOR CARRYING OUT THE INVENTION

The best mode for carrying out the present invention is now explained. First of all, the arrangement of the dielectric porcelain composition according to the present invention is explained.

Explanation of the Dielectric Porcelain Composition

The dielectric porcelain composition of the present invention comprises a main component composition represented by a composition formula {α(xBaO·yNd$_2$O$_3$·zTiO$_2$)+β (2MgO·SiO$_2$)}.

Further, the dielectric porcelain composition of the present invention comprises a zinc oxide, a boron oxide, a copper oxide and an alkaline earth metal oxide as subordinate components relative to that main component composition. In a more preferable embodiment of the present invention, a given amount of Ag is contained as an additional subordinate component.

In what follows, the main component composition, and the subordinate component composition of the dielectric porcelain composition according to the present invention will be explained in further details. First of all, the main component composition is explained.

Explanation of the Main Component Composition

As already noted, the dielectric porcelain composition of the present invention contains the main component composition represented by the composition formula $\{\alpha(xBaO \cdot yNd_2O_3 \cdot zTiO_2)+\beta(2MgO \cdot SiO_2)\}$, wherein x, y and z indicative of the molar ratios (mol %) of BaO, $Nd_2O_3$ and $TiO_2$ are in the ranges of $$9(\text{mol }\%) \leqq x \leqq 22(\text{mol }\%)$$

$$9(\text{mol }\%) \leqq y \leqq 29(\text{mol }\%)$$

$$61(\text{mol }\%) \leqq z \leqq 74(\text{mol }\%)$$

and have a relation of x+y+z=100 (mol %).

Further, $\alpha$ and $\beta$ indicative of the volume ratio (vol %) of each component in that main component composition are in the ranges of $$15(\text{vol }\%) \leqq \alpha \leqq 75(\text{vol }\%)$$

$$25(\text{vol }\%) \leqq \beta \leqq 85(\text{vol }\%)$$

and have a relation of $\alpha+\beta=100$ (vol %).

It is required that the proportion x of BaO contained be within the aforesaid range, that is, 9 (mol %)≦x≦22 (mol %). Preferably, 10 (mol %)≦x≦19 (mol %), and more preferably, 14 (mol %)≦x≦19 (mol %).

As the proportion of BaO contained does not reach 9 (mol %), there are dielectric losses tending to grow large and the Q·f value tending to go down, resulting in an increase in the power loss of a high-frequency device. As the proportion of BaO contained exceeds 22 (mol %), on the other hand, low-temperature sintering capability tends to become worse, resulting in inability to form any dielectric porcelain composition. Otherwise, there are dielectric losses growing larger and the Q·f value going further down, leading to inconvenience that the power loss of the high-frequency device grows large.

It is required that the proportion of $Nd_2O_3$ contained be within the aforesaid range, that is, 9 (mol %)≦y≦29 (mol %). Preferably, 9 (mol %)≦y≦22 (mol %), and more preferably, 12 (mol %)≦y≦17 (mol %).

As the proportion of $Nd_2O_3$ contained does not reach 9 (mol %), there are dielectric losses tending to grow large and the Q·f value tending to go down, resulting in an increase in the power loss of a high-frequency device. As the proportion of $Nd_2O_3$ contained exceeds 29 (mol %), on the other hand, dielectric losses tend to grow large, and the Q·f value tends to go down, and the temperature coefficient of resonance frequency (τf) tends to grow large in a negative direction as well. Consequently, the power loss of the high-frequency device will grow large, and the resonance frequency of the high-frequency device will be likely to fluctuate with temperatures.

It is required that the proportion of $TiO_2$ contained be within the aforesaid range, that is, 61 (mol %)≦z≦74 (mol %). Preferably, 61.5 (mol %)≦z≦74 (mol %), and more preferably, 65 (mol %)≦z≦71 (mol %).

As the proportion of $TiO_2$ contained does not reach 61 (mol %), dielectric losses grow large, which will cause the Q·f value to tend to go down, and the temperature coefficient of resonance frequency (τf) to tend to grow large in a negative direction as well. Consequently, the power loss of a high-frequency device will grow large, and the resonance frequency of the high-frequency device will be likely to fluctuate with temperatures. As the proportion of $TiO_2$ contained exceeds 74 (mol %), on the other hand, low-temperature sintering capability becomes worse, which will tend to result in inability to form any dielectric porcelain composition.

In the composition formula for the aforesaid main component composition, $\alpha$ and $\beta$ are indicative of the volume ratios of (1) BaO, $Nd_2O_3$ and $TiO_2$ and (2) MgO and $SiO_2$.

As already noted, $\alpha$ and $\beta$ are in the ranges of $$15(\text{vol }\%) \leqq \alpha \leqq 75(\text{vol }\%)$$

$$25(\text{vol }\%) \leqq \beta \leqq 85(\text{vol }\%)$$

and have a relation of $\alpha+\beta=100$ (vol %). Preferably, 25 (vol %)≦α≦65 (vol %) and 35 (vol %)≦β≦65 (vol %), and more preferably, 35 (vol %)≦α≦55 (vol %) and 45 (vol %)≦β≦65 (vol %).

As the value of $\alpha$ exceeds 75 (vol %) and the value of $\beta$ does not reach 25 (vol %), the specific dielectric constant $\in r$ of the dielectric porcelain composition tends to grow large, and the temperature coefficient of resonance frequency (τf) tends to grow large in a positive direction. The increase in the specific dielectric constant $\in r$ will render it difficult to enhance the characteristics of a multilayer type device joined to the BaO-rare earth oxide-$TiO_2$ base dielectric porcelain composition, and cause the temperature coefficient of resonance frequency (τf) to grow large, rendering the resonance frequency of a high-frequency device likely to fluctuate with temperatures. As the value of $\alpha$ does not reach 15 (vol %) and the value of $\beta$ exceeds 85 (vol %), on the contrary, the temperature coefficient of resonance frequency (τf) of the dielectric porcelain composition tends to grow large in a negative direction, leading to inconvenience that the resonance frequency of the high-frequency device is apt to fluctuate with temperatures.

Preferably in the present invention, MgO and $SiO_2$ contained as a part of the main component composition are contained in forsterite crystal form in the dielectric porcelain composition.

Whether or not the forsterite crystal is contained in the dielectric porcelain composition may be checked up by an X-ray diffractometry (XRD) system.

A dielectric porcelain composition containing a BaO—$Nd_2O_3$—$TiO_2$ base compound as a main component has a specific dielectric constant as high as $\in r$=55 to 105, whereas forsterite has a specific dielectric constant as low as $\in r$=6.8 in a single form. The dielectric porcelain composition here contains as the main components a BaO—$Nd_2O_3$—$TiO_2$ base compound and a forsterite crystal, and so can have a reduced specific dielectric constant.

In most cases, the temperature coefficient τf of resonance frequency of a dielectric porcelain composition containing a BaO—$Nd_2O_3$—$TiO_2$ base compound as a main component has a positive value, whereas forsterite has a negative temperature coefficient of resonance frequency τf=−65 (ppm/K). The incorporation of the BaO—$Nd_2O_3$—$TiO_2$ base compound and forsterite crystal as the main components of the dielectric porcelain composition enables the positive temperature coefficient of resonance frequency to be canceled out by the negative temperature coefficient of resonance frequency so that the temperature coefficient of resonance frequency of the dielectric porcelain composition can be brought to near zero. Further, if the content of forsterite crystals in the main component composition is increased or decreased, it is then possible to regulate the temperature coefficient of resonance frequency of the dielectric porcelain composition here.

A dielectric porcelain composition containing a BaO—$Nd_2O_3$—$TiO_2$ base compound as a main component has a Q·f value of Q·f=about 2,000 to about 8,000 GHz, whereas forsterite has a dielectric loss as small as Q·f=200,000 GHz in a single form. The incorporation of the BaO—$Nd_2O_3$—$TiO_2$ base compound and forsterite crystal as the main components of the dielectric porcelain composition allows that composition to have a low dielectric loss.

The dielectric porcelain composition here contains the desired subordinate components added to the main component composition so that it can be fired at a temperature lower than the melting point of a conductor formed of Ag, an alloy containing Ag as a primary component or the like.

Explanation of the Subordinate Components

As already noted, the dielectric porcelain composition of the present invention contains as the subordinate components a zinc oxide, a boron oxide, a copper oxide and an alkaline earth metal oxide. In a more preferable embodiment of the present invention, silver (Ag) is used in addition to those subordinate components.

When those subordinate components are represented by $aZnO$, $bB_2O_3$, $cCuO$ and $dRO$ where R is an alkaline earth metal, a, b, c and d indicative of the weight ratio (wt %) of each subordinate component relative to the aforesaid main component composition are within the ranges of $0.1 \text{ (wt \%)} \leq a \leq 12.0 \text{ (wt \%)}$ $0.1 \text{ (wt \%)} \leq b \leq 12.0 \text{ (wt \%)}$ $0.1 \text{ (wt \%)} \leq c \leq 9.0 \text{ (wt \%)}$ $0.2 \text{ (wt \%)} \leq d \leq 5.0 \text{ (wt \%)}$ When Ag is used as an additional or optional subordinate component, it is required that $0.3 \text{ (wt \%)} \leq e \leq 3.0 \text{ (wt \%)}$, and preferably, $1.0 \text{ (wt \%)} \leq e \leq 2.0 \text{ (wt \%)}$, where e stand for the weight ratio of the Ag subordinate component relative to the main component composition.

More specifically, it is required that the proportion of the zinc oxide contained relative to the main component composition is $0.1 \text{ (wt \%)} \leq a \leq 12.0 \text{ (wt \%)}$, as calculated on ZnO basis. Preferably, $0.5 \text{ (wt \%)} \leq a \leq 9.0 \text{ (wt \%)}$, and more preferably, $1.0 \text{ (wt \%)} \leq a \leq 7.0 \text{ (wt \%)}$.

As the proportion of the zinc oxide contained relative to the main component composition does not reach 0.1 (wt %) as calculated on ZnO basis, the dielectric porcelain composition tends to have a slender effect on low-temperature sintering. As the proportion of the zinc oxide contained relative to the main component composition exceeds 12.0 (wt %) as calculated on ZnO basis, on the other hand, there are dielectric losses tending to grow large and the Q·f value tending to go down.

It is required that the proportion of the boron oxide contained relative to the main component composition be $0.1 \text{ (wt \%)} \leq b \leq 12.0 \text{ (wt \%)}$, as calculated on $B_2O_3$ basis. Preferably, $0.5 \text{ (wt \%)} \leq b \leq 9.0 \text{ (wt \%)}$, and more preferably, $1.0 \text{ (wt \%)} \leq b \leq 7.0 \text{ (wt \%)}$.

As the proportion of the boron oxide contained relative to the main component composition does not reach 0.1 (wt %) as calculated on $B_2O_3$ basis, the dielectric porcelain composition tends to have a tenuous effect on low-temperature sintering. As the proportion of the boron oxide contained relative to the main component composition exceeds 12.0 (wt %) as calculated on $B_2O_3$ basis, on the other hand, there are dielectric losses tending to grow large and the Q·f value tending to go down.

It is required that the proportion of the copper oxide contained relative to the main component composition be $0.1 \text{ (wt \%)} \leq c \leq 9.0 \text{ (wt \%)}$, as calculated on CuO basis. Preferably, $0.5 \text{ (wt \%)} \leq c \leq 6.0 \text{ (wt \%)}$, and more preferably, $1.0 \text{ (wt \%)} \leq c \leq 4.0 \text{ (wt \%)}$.

As the proportion of the copper oxide contained relative to the main component composition does not reach 0.1 (wt %) as calculated on CuO basis, the dielectric porcelain composition tends to have a slender effect on low-temperature sintering.

As the proportion of the copper oxide contained relative to the main component composition exceeds 9.0 (wt %) as calculated on CuO basis, on the other hand, there are dielectric losses tending to grow large and the Q·f value tending to go down.

In the present invention, there is the alkaline earth metal oxide added to the main component composition in addition to the aforesaid subordinate components so as to achieve further improvements in the low-temperature sintering capability of the dielectric porcelain composition (that enables sintering at a lower temperature). It is thus required that the proportion of the alkaline earth metal oxide added to the main component composition be $0.02 \text{ (wt \%)} \leq d \leq 5.0 \text{ (wt \%)}$, as calculated on RO basis where R is an alkaline earth metal. Preferably, $0.5 \text{ (wt \%)} \leq d \leq 5.0 \text{ (wt \%)}$, and more preferably, $1.0 \text{ (wt \%)} \leq d \leq 3.0 \text{ (wt \%)}$.

A suitable example of the alkaline earth metal R is Ba, Sr, and Ca which may be used in admixture of two or more.

As the proportion of the alkaline earth metal oxide contained in the main component composition does not reach 0.2 (wt %) as calculated on RO basis where R is an alkaline earth metal, there would be no effect on further improvements in low-temperature sintering capability. As the proportion of the alkaline earth metal oxide contained relative to the main component composition exceeds 5.0 (wt %) as calculated on RO basis, on the other hand, there are dielectric losses tending to grow large and the Q·f value tending to go down, although some effects on improvements in low-temperature sintering capability are expectable.

It is here noted that when Ba is used as the alkaline earth metal R, the proportion of Ba contained relative to the main component composition is preferably in the range of $0.5\% \text{ wt \%} \leq d \leq 3.5 \text{ (wt \%)}$ as calculated on BaO basis; when Sr is used as the alkaline earth metal oxide R, the proportion of Sr contained relative to the main component composition is preferably in the range of $0.4 \text{ (wt \%)} \leq d \leq 2.5 \text{ (wt \%)}$ as calculated on SrO basis; and when Ca is used as the alkaline earth metal oxide R, the proportion of Ca contained relative to the main component composition is preferably in the range of $0.2 \text{ (wt \%)} \leq d \leq 1.5 \text{ (wt \%)}$ as calculated on CaO basis.

In a more preferable embodiment of the present invention, the dielectric porcelain composition contains, in addition to the above predetermined subordinate components, silver (Ag) so that it makes sure stable capacitance and insulation resistance value even upon firing at a relatively low temperature while its low-temperature sintering capability (enough to make firing at much lower temperatures possible) is much more improved. By the incorporation in the dielectric porcelain composition of Ag as an optional subordinate component, it is possible to prevent diffusion of Ag from the internal conductor into the dielectric matrix material at a time when that internal conductor is formed of Ag or an Ag alloy. As the content of Ag contained relative to the main component composition does not reach 0.3 (wt %), there would be no further improvement in the low-temperature sintering capability. Moreover, the effect on prevention of Ag diffusion becomes insufficient, bringing on ailments due to Ag diffusion, for instance, dielectric constant variations due to an uneven content of Ag in the dielectric material, voids occurring between the conductor and the dielectric matrix material due to a decrease in the content of Ag in the internal conductor, and defective conduction due to the lead-in of the internal conductor at a portion of connection with the outside. As the content of Ag relative to the main component composition exceeds 3.0 (wt %), on the other hand, there may be some effects on low-temperature sintering capability; however, there are dielectric losses tending to grow large and the Q·f value tending to go down. Moreover, the acceptable amount of Ag taken in the dielectric material by way of diffusion is exceeded, resulting in segregation of Ag in the dielectric matrix material, which is not preferable because of adverse influences on reliability such as voltage load life.

The dielectric porcelain composition of the present invention contains $BaO$, $Nd_2O_3$, $TiO_2$, $MgO$ and $SiO_2$ as the main components, and $ZnO$, $B_2O_3$, $CuO$ and $RO$ where R is an alkaline earth metal oxide as the subordinate components. In a more preferable embodiment of the present invention, Ag is used as an optional subordinate component. Especially if $MgO$ and $SiO_2$ (forsterite crystal in particular) are contained as the main components, then the specific dielectric constant can be lower than the general specific dielectric constant of $BaO$-rare earth oxide-$TiO_2$ base dielectric porcelain compositions.

Especially if RO where R is an alkaline earth metal oxide is used as one subordinate component, more preferably with the addition of Ag as an optional subordinate component, it makes sure co-firing with a conductor formed of Ag, an alloy containing Ag as a main ingredient or the like, leading to a lot more improvements in low-temperature sintering capability.

The material of the dielectric porcelain composition according to the present invention is similar to that of the $BaO$-rare earth oxide-$TiO_2$ base dielectric porcelain composition, and so its shrinkage behavior and linear expansion coefficient at the time of firing are equivalent to those of the $BaO$-rare earth oxide-$TiO_2$ base dielectric porcelain composition. In other words, even when the dielectric porcelain composition of the present invention is joined to and fired with the $BaO$-rare earth oxide-$TiO_2$ base dielectric porcelain composition into a multilayer type device, defects are less likely to occur at the interface. Thus, the dielectric porcelain composition of the present invention can be joined to the $BaO$-rare earth oxide-$TiO_2$ base dielectric porcelain composition to fabricate a multilayer type device of high performance.

Note here that the dielectric porcelain composition according to the present invention may contain other compounds and elements within such a range that the objects and advantages of the present invention are achievable. The incorporation of the manganese oxide in particular in the main component composition ensures that dielectric losses can be minimized.

To provide a less expensive yet smaller device, the dielectric porcelain composition according to the present invention must have as an internal conductor a conductor formed of less expensive Ag, an alloy containing Ag as a main component or the like, as already mentioned. Hence, the dielectric porcelain composition must have low-temperature sintering capability enough to enable firing to be carried out at a temperature lower than the melting point of the conductor used as the internal conductor. Because the dielectric characteristics of the dielectric porcelain composition are affected by sintering temperatures, too, the firing temperature must be 860° C. to 1,000° C., and preferably 870° C. to 940° C.

An account of the dielectric loss of a dielectric porcelain composition that is an important consideration in the present invention is now given.

As an alternate current is applied to an ideal dielectric material, an electric current and a voltage have a phase difference of 90°. As the frequency of the alternate current grows high to a point where there is a high frequency, however, the polarization of the dielectric material or the orientation of polar molecules can never respond to changes in a high-frequency electric filed, or an electric flux density has a phase delay with respect to an electric field due to the conduction of electrons or ions with the result that the electric current and the voltage come to have a phase other than 90°. The dielectric loss is a phenomenon in which a part of the energy of the aforesaid high frequency dissipates off in the form of heat. The magnitude of dielectric loss is represented by a reciprocal Q (Q=1/tan δ) of the tangent tan δ of a loss angle δ that is a difference between the phase difference of a real current and voltage and the 90° phase difference of an ideal current and voltage. For the estimation of dielectric losses of the dielectric porcelain composition according to the present invention, the value of Q·f that is the product of the aforesaid Q and resonance frequency is used. The smaller the dielectric loss, the larger the value of Q·f grows, and the larger the dielectric loss, the smaller the value of Q·f becomes. The dielectric loss is tantamount to the power loss of a high-frequency device, and so there is a demand for a dielectric porcelain composition having a greater Q·f value. In addition, a multilayer type device must have limited power losses so as to have higher performance; that is, the Q·f value must be at least 4,000 GHz, and preferably 4,5000 GHz or greater.

One of the objects of the present invention is to make it possible to form a multilayer type device by joining the dielectric porcelain composition of the present invention to a $BaO$-rare earth oxide-$TiO_2$ base dielectric porcelain composition having a high specific dielectric constant. In other words, one technical challenge of the present invention is to provide a dielectric porcelain composition having a specific dielectric constant lower than that of that $BaO$-rare earth oxide-$TiO_2$ base dielectric porcelain composition. Some $BaO$-rare earth oxide-$TiO_2$ base dielectric porcelain compositions have been reported to have a specific dielectric constant of 50 to 105; however, the dielectric porcelain composition of the present invention is required to have a specific dielectric constant ∈r of up to 50. For a multilayer type device of higher performance, the dielectric constant ∈r should be preferably up to 40, and more preferably up to 35, and even more preferably 25 to 35.

An account of the temperature coefficient tf (ppm/K) of resonance frequency of a dielectric porcelain composition that is another important consideration in the present invention is now given.

The temperature coefficient tf (ppm/K) of resonance frequency of a dielectric porcelain composition is worked out from the following equation (1).

$$\tau f = [f_T - f_{ref}/f_{ref}(T - T_{ref})] \times 1,000,000 \text{ (ppm/K)} \quad (1)$$

Here $f_T$ is indicative of a resonance frequency (kHz) at a temperature T, and $f_{ref}$ is indicative of a resonance frequency (kHz) at a reference temperature $T_{ref}$.

The magnitude of the absolute value of the temperature coefficient τf of resonance frequency means the magnitude of the quantity of change in the resonance frequency of a dielectric porcelain composition relative to temperature changes. For high-frequency devices like capacitors and dielectric filters, it is required to diminish resonance frequency changes with temperatures, and for the dielectric porcelain composition of the present invention, too, it is required to diminish the absolute value of the temperature coefficient τf of resonance frequency.

When the dielectric porcelain composition of the present invention is used for a dielectric resonator, the temperature coefficient τf of resonance frequency must be in the range of −40 (ppm/K) to +40 (ppm/K) so as to obtain further reductions in resonance frequency changes with temperatures. Moreover, for multilayer type devices of higher performance, the temperature coefficient τf must be in the range of −28 (ppm/K) to +28 (ppm/K), and preferably −20 (ppm/K) to +20 (ppm/K).

The estimation of low-temperature sintering capability of a dielectric porcelain composition may be made by firing the starting components at a gradually decreasing temperature to find out whether sintering proceeds to a level at which the desired dielectric characteristics are measurable. The estimation of dielectric characteristics of a dielectric porcelain composition may be made by taking measurements of dielectric loss, resonance frequency changes with temperature changes (the temperature coefficient of resonance frequency) and specific dielectric constant pursuant to JIS R 1627 1996 (Testing Method for the Dielectric Characteristics of Fine Ceramics in Microwave Applications).

Explanation of Dielectric Porcelain Composition Production Process

Next, the production process for the dielectric porcelain composition of the present invention is explained.

Reference is here made to the case where there is Ag added as an optional subordinate component, and the case where there is no Ag added. That is, the production process is explained with reference to the first production process embodiment wherein there is no Ag added as an optional subordinate component to the subordinate component composition consisting of ZnO, $B_2O_3$, CuO and the alkaline earth metal oxide RO (R is an alkaline earth metal), and the second production process embodiment wherein there is Ag added as an optional subordinate component to the subordinate component composition consisting of ZnO, $B_2O_3$, CuO and the alkaline earth metal oxide RO (R is an alkaline earth metal).

FIRST PRODUCTION PROCESS EMBODIMENT WITH NO AG ADDED AS SUBORDINATE COMPONENT

In the production process for the dielectric porcelain composition of the present invention, the barium-containing raw material, the neodymium-containing raw material, the titanium-containing raw material, the magnesium-containing raw material, the silicon-containing raw material, the zinc-containing raw material, the boron-containing raw material, the copper-containing raw material and the alkaline earth metal-containing raw material are fired together into a BaO—$Nd_2O_3$—$TiO_2$—MgO—$SiO_2$—ZnO—$B_2O_3$—CuO—RO (R is an alkaline earth metal) base dielectric porcelain composition, wherein forsterite (2MgO·$SiO_2$) powders are used as the magnesium-containing raw material and the silicon-containing raw material.

For production raw materials for the dielectric porcelain composition of the present invention, oxides and/or compounds that turn into oxides upon firing are used. Examples of the compounds that turn into oxides upon firing are carbonates, nitrates, oxalates, hydroxides, sulfides, and organic metal compounds.

Figure 1:
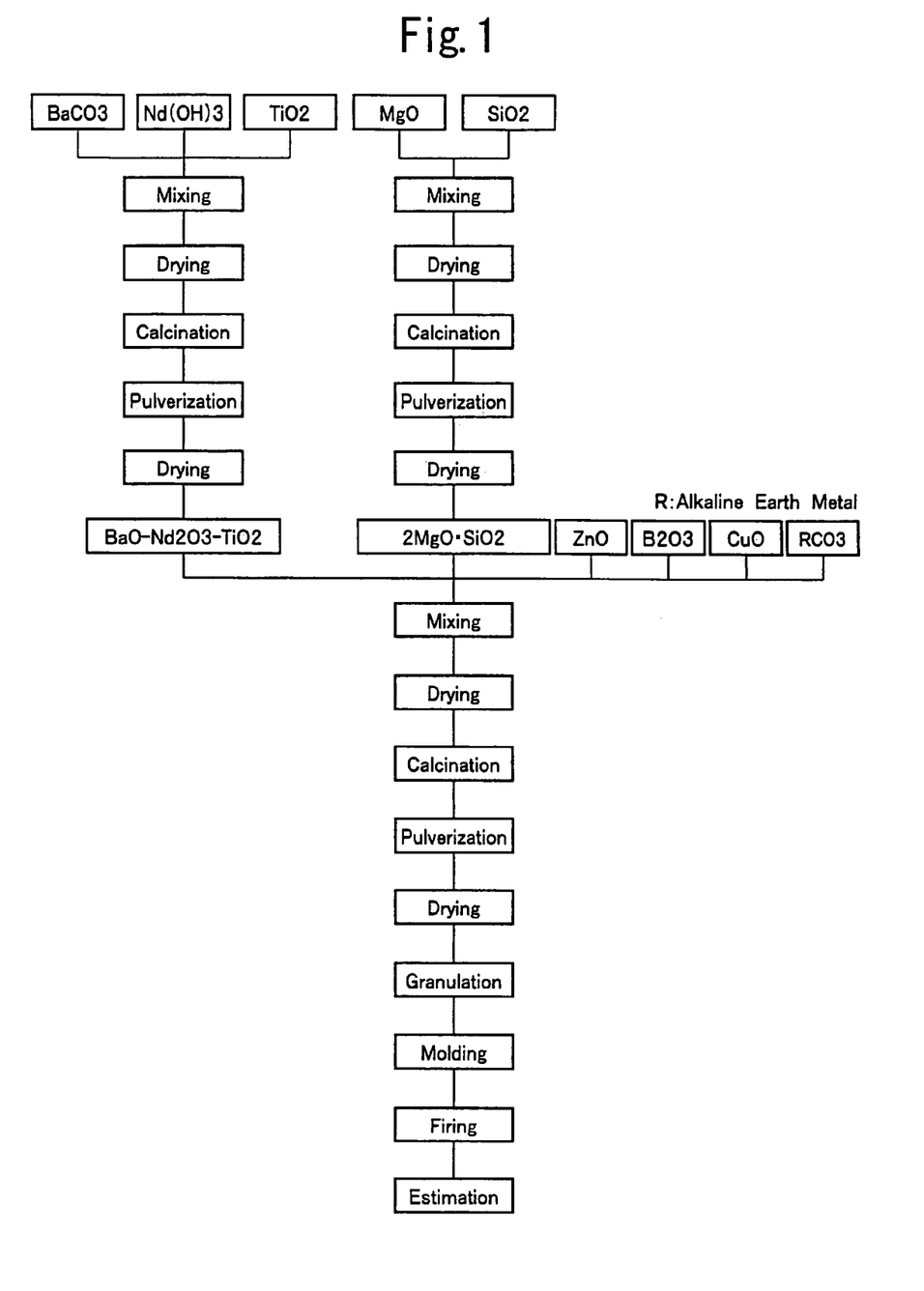
FIG. 1 is a flowchart of one preferable embodiment of the dielectric porcelain composition production process according to the present invention.

FIG. 1 is illustrative of the first production process embodiment (with no addition of Ag) for the dielectric porcelain composition production process according to the present invention.

The dielectric porcelain composition production process according to the present invention is now explained in more details with reference to FIG. 1.

First of all, for instance, barium carbonate, neodymium hydroxide and titanium oxide that are a part of the main component composition are provided at the ready. Then, they are weighed and mixed together in given amounts, and calcined.

Mixing here is carried out such that the molar ratios x, y and z in the composition formula xBaO·y$Nd_2O_3$·z$TiO_2$ satisfy the above composition relations.

Barium carbonate, neodymium oxide and titanium oxide may be mixed either dry or wet. For instance, they may be mixed by means of a ball mill in a mixing mode using purified water or a solvent such as ethanol. The mixing time may be about 4 hours to about 24 hours.

Thereafter, the mixed raw material is dried at 100° C. to 200° C., preferably 120° C. to 140° C. for about 12 hours to about 36 hours, followed by calcination.

Calcination is a step for the synthesis of a BaO—$Nd_2O_3$—$TiO_2$ base compound from a mixture material comprising barium carbonate, neodymium hydroxide and titanium oxide. That step is preferably carried out at a calcination temperature of 1,100° C. to 1,500° C., especially 1,100° C. to 1,350° C. for about 1 hour to about 24 hours.

The synthesized BaO—$Nd_2O_3$—$TiO_2$ base compound is pulverized into powders, and dried. Pulverization may be carried out either dry or wet, for instance, by means of a ball mill relying on a pulverization mode using purified water or a solvent such as ethanol.

The powders obtained by pulverization may be dried at a drying temperature of 100° C. to 200° C., preferably 120° C. to 140° C. for about 12 hours to about 36 hours. In this way, BaO—$Nd_2O_3$—$TiO_2$ base compound powders may be obtained.

Then, magnesium oxide and silicon oxide that are another part of the main component composition are at the ready. They are weighed and mixed together in given amounts, and calcined. Mixing of magnesium oxide with silicon oxide may be carried out either dry or wet, for instance, by means of a ball mill in a mixing mode relying upon purified water or a solvent such as ethanol. The mixing time may be about 4 to about 24 hours.

Thereafter, the mixed raw material was dried at 100° C. to 200° C., preferably 120° C. to 140° C. for about 12 hours to about 36 hours, followed by calcination.

Calcination is a step for the synthesis of forsterite crystals from a mixture of magnesium oxide with silicon oxide, which step is preferably carried out at a temperature of 1,100° C. to 1,500° C., especially 1,100° C. to 1,350° C. for about 1 hour to about 24 hours.

The incorporation as the main components of the BaO—$Nd_2O_3$—$TiO_2$ base compound and the forsterite crystal ensures that, by the effect of the forsterite crystal, the specific dielectric constant ∈r of the dielectric porcelain composition is let go down, and the temperature coefficient of resonance frequency is brought to near zero, ending up with reduced dielectric losses. To enhance the effect of forsterite added, it is required to reduce a portion of the aforesaid raw material that does not turn into forsterite and remains unreacted; it is desired that the aforesaid raw material mixing be carried out such that the number of moles of magnesium is twice as many as that of silicon.

The synthesized forsterite is pulverized into powders, and dried. Pulverization may be carried out either dry or wet, for instance, by means of a ball mill in a pulverization mode using purified water or a solvent such as ethanol. The pulverization time may be about 4 hours to about 24 hours.

The powders may be dried at a drying temperature of 100° C. to 200° C., preferably 120° C. to 140° C. for about 12 hours to about 36 hours. Thus, forsterite powders may be obtained.

Instead of obtaining forsterite powders by the synthesis and pulverization of forsterite from the magnesium-containing raw material and the silicon-containing raw material as shown in FIG. 1, it is acceptable to use commercially available forsterite. That is, a commercial forsterite product may be pulverized by means of a ball mill in a pulverization mode using purified water or a solvent such as ethanol, and then dried at 100° C. to 200° C., preferably 120° C. to 140° C. for about 12 hours to about 36 hours into forsterite powders.

Next, the $BaO-Nd_2O_3-TiO_2$ base compound powders, the forsterite powders, and zinc oxide, boron oxide, copper oxide and alkaline earth metal carbonate that are weighed in such a given range as to satisfy the aforesaid subordinate component composition are mixed together into a raw mixture powder material.

Mixing may be carried out either dry or wet, for instance, by means of a ball mill in a mixing mode using purified water or a solvent such as ethanol. The mixing time may be about 4 hours to about 24 hours.

After the completion of mixing, the raw mixture powder material was dried at 100° C. to 200° C., preferably 120° C. to 140° C. for about 12 hours to about 36 hours.

Next, the raw mixture powder material is again calcined at a temperature lower than the firing temperature, for instance, 700° C. to 800° C. for about 1 to about 10 hours. With that calcination carried out at a lower temperature, forsterite does not melt so that a crystal form of forsterite can be incorporated in the dielectric porcelain composition. Thereafter, the calcined raw mixture powder material is pulverized and dried. Pulverization is carried out either dry or wet, for instance, by means of a ball mill in a pulverization mode using purified water or a solvent such as ethanol. The pulverization time may be about 4 hours to about 24 hours. The powders obtained by pulverization may be dried at a drying temperature of 100° C. to 200° C., preferably 120° C. to 140° C. for about 12 hours to about 36 hours. Thus, by carrying out the second calcination and pulverization, the main and subordinate components can be placed in a uniform state so that the dielectric porcelain composition here can be obtained in a uniform state at later production steps.

After mixing the powders obtained as described above with an organic binder based on, for instance, polyvinyl alcohol, acryl, and ethyl cellulose, the mixture is molded in a desired shape, followed by sintering by firing of the molded product. Molding may be carried out either in a wet mode such as a sheet process or printing, or in a dry mode such as press molding; appropriate selection may be from molding processes depending on the desired shape. Firing is preferably carried out in an oxygen atmosphere such as air, and the firing temperature must be lower than the melting point of Ag or an alloy containing Ag as a main component that forms a conductor that is used as an internal electrode, for instance, at 860° C. to 1,000° C., preferably 870° C. to 940° C.

A multilayer type device is fabricated of a multilayer ceramic substrate comprising a plurality of ceramic layers, each with a built-in dielectric device such as a capacitor or inductor. The multilayer ceramic substrate is fabricated by stacking and co-firing a plurality of green sheets of ceramic material having different dielectric characteristics while conductors as internal conductors are located at interfaces optionally with through-holes. By stacking a green sheet molded of the dielectric porcelain composition of the present invention on a green sheet molded of a general BaO-rare earth oxide-$TiO_2$ base dielectric porcelain composition known in the art, it is possible to fabricate a multilayer ceramic substrate using the dielectric porcelain composition of the present invention.

SECOND PRODUCTION PROCESS EMBODIMENT WITH AG ADDED AS SUBORDINATE COMPONENT

In the production process for the dielectric porcelain composition of the present invention, a mixture containing the barium-containing raw material, the neodymium-containing raw material, the titanium-containing raw material, the magnesium-containing raw material, the silicon-containing raw material, the zinc-containing raw material, the boron-containing raw material, the copper-containing raw material, the alkaline earth metal-containing raw material and silver (Ag) is fired into a $BaO-Nd_2O_3-TiO_2-MgO-SiO_2-ZnO-B_2O_3-CuO-RO$ (R is an alkaline earth metal)-Ag base dielectric porcelain composition, wherein forsterite ($2MgO \cdot SiO_2$) powders are used as the magnesium-containing raw material and the silicon-containing raw material.

For production raw materials for the dielectric porcelain composition of the present invention, oxides and/or compounds that turn into oxides upon firing are primarily used. For Ag, metal Ag and/or a compound that turns into metal Ag upon heat treatment at the time of calcination are used.

Examples of the compounds that turn into oxides upon firing are carbonates, nitrates, oxalates, hydroxides, sulfides, and organic metal compounds. Ag is added in the form of, for instance, metal silver (Ag), silver nitrate ($AgNO_3$), silver oxide ($Ag_2O$), and silver chloride (AgCl).

Figure 2:
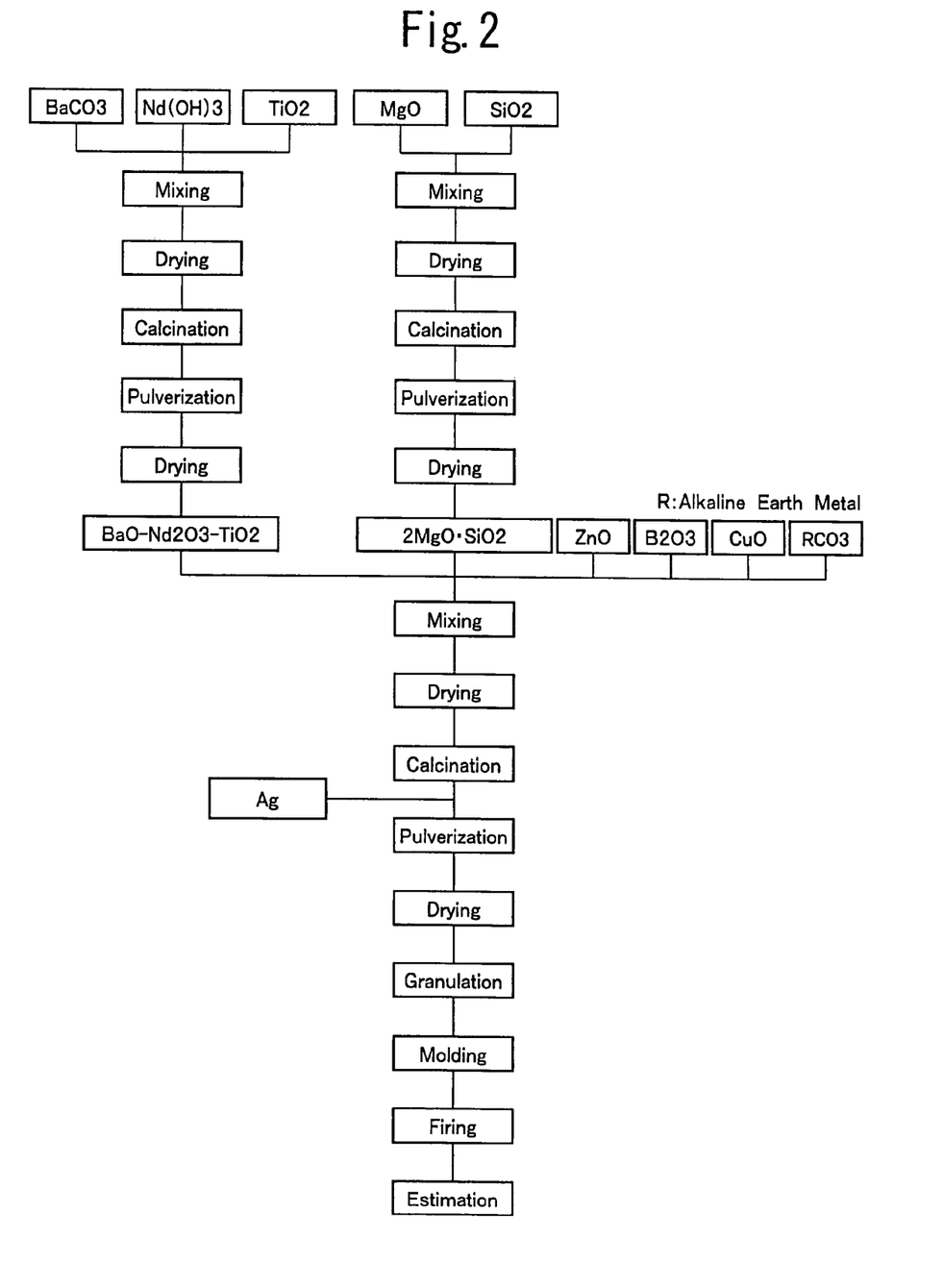
FIG. 2 is a flowchart of one preferable embodiment of the dielectric porcelain composition production process according to the present invention.

FIG. 2 is illustrative of the second production process embodiment (with the addition of Ag as an optional subordinate component) for the dielectric porcelain composition production process according to the present invention.

The dielectric porcelain composition production process according to the present invention is now explained in more details with reference to FIG. 2.

First of all, for instance, barium carbonate, neodymium hydroxide and titanium oxide that are a part of the main component composition are provided at the ready. Then, they are weighed and mixed together in given amounts, and calcined.

Mixing here is carried out such that the molar ratios x, y and z in the composition formula $xBaO \cdot yNd_2O_3 \cdot zTiO_2$ satisfy the above composition relations.

Barium carbonate, neodymium oxide and titanium oxide may be mixed either dry or wet. For instance, they may be mixed by means of a ball mill in a mixing mode using purified water or a solvent such as ethanol. The mixing time may be about 4 hours to about 24 hours.

Thereafter, the mixed raw material is dried at 100° C. to 200° C., preferably 120° C. to 140° C. for about 12 hours to about 36 hours, followed by calcination.

Calcination is a step for the synthesis of a $BaO-Nd_2O_3-TiO_2$ base compound from a mixture material comprising barium carbonate, neodymium hydroxide and titanium oxide. That step is preferably carried out at a calcination temperature of 1,100° C. to 1,500° C., especially 1,100° C. to 1,350° C. for about 1 hour to about 24 hours.

The synthesized $BaO-Nd_2O_3-TiO_2$ base compound is pulverized into powders, and dried. Pulverization may be carried out either dry or wet, for instance, by means of a ball mill relying on a pulverization mode using purified water or a solvent such as ethanol. Pulverization time may be about 4 hours to 24 hours.

The powders obtained by pulverization may be dried at a drying temperature of 100° C. to 200° C., preferably 120° C. to 140° C. for about 12 hours to about 36 hours. In this way, $BaO-Nd_2O_3-TiO_2$ base compound powders may be obtained.

Then, magnesium oxide and silicon oxide that are another part of the main component composition are at the ready. They are weighed and mixed together in given amounts, and calcined. Mixing of magnesium oxide with silicon oxide may be carried out either dry or wet, for instance, by means of a ball mill in a mixing mode relying upon purified water or a solvent such as ethanol. The mixing time may be about 4 to about 24 hours.

Thereafter, the mixed raw material was dried at 100° C. to 200° C., preferably 120° C. to 140° C. for about 12 hours to about 36 hours, followed by calcination.

Calcination is a step for the synthesis of forsterite crystals from a mixture of magnesium oxide with silicon oxide, which step is preferably carried out at a temperature of 1,100° C. to 1,500° C., especially 1,100° C. to 1,350° C. for about 1 hour to about 24 hours.

The incorporation as the main components of the BaO—$Nd_2O_3$—$TiO_2$ base compound and the forsterite crystal ensures that, by the effect of the forsterite crystal, the specific dielectric constant ∈r of the dielectric porcelain composition is let go down, and the temperature coefficient of resonance frequency is brought to near zero, ending up with reduced dielectric losses. To enhance the effect of forsterite added, it is required to reduce a portion of the aforesaid raw material that does not turn into forsterite and remains unreacted; it is desired that the aforesaid raw material mixing be carried out such that the number of moles of magnesium is twice as many as that of silicon.

The synthesized forsterite is pulverized into powders, and dried. Pulverization may be carried out either dry or wet, for instance, by means of a ball mill in a pulverization mode using purified water or a solvent such as ethanol. The pulverization time may be about 4 hours to about 24 hours.

The powders obtained by pulverization may be dried at a drying temperature of 100° C. to 200° C., preferably 120° C. to 140° C. for about 12 hours to about 36 hours. Thus, forsterite powders may be obtained.

Instead of obtaining forsterite powders by the synthesis and pulverization of forsterite from the magnesium-containing raw material and the silicon-containing raw material as shown in FIG. 2, it is acceptable to use commercially available forsterite. That is, a commercial forsterite product may be pulverized by means of a ball mill in a pulverization mode using purified water or a solvent such as ethanol, and then dried at 100° C. to 200° C., preferably 120° C. to 140° C. for about 12 hours to about 36 hours into forsterite powders.

Next, the BaO—$Nd_2O_3$—$TiO_2$ base compound powders, the forsterite powders, and zinc oxide, boron oxide, copper oxide and alkaline earth metal carbonate that are weighed in such a given range as to satisfy the aforesaid subordinate component composition are mixed together into a raw mixture powder material.

Mixing may be carried out either dry or wet, for instance, by means of a ball mill in a mixing mode using purified water or a solvent such as ethanol. The mixing time may be about 4 hours to about 24 hours.

After the completion of mixing, the raw mixture powder material was dried at 100° C. to 200° C., preferably 120° C. to 140° C. for about 12 hours to about 36 hours.

Next, the raw mixture powder material is again calcined at a temperature lower than the firing temperature, for instance, 700° C. to 800° C. for about 1 to about 10 hours. With that calcination carried out at a lower temperature, forsterite does not melt so that a crystal form of forsterite can be incorporated in the dielectric porcelain composition.

Thereafter, metal Ag is added at the time of pulverization of the calcined raw mixture powder material, followed by drying. Note here that the addition of Ag may be performed at the mixing time prior to calcination, not at the pulverization time, in which case Ag is added in the form of Ag, $AgNO_3$, $Ag_2O$, AgCl or the like, as already noted.

Pulverization is carried out either dry or wet, for instance, by means of a ball mill in a pulverization mode using purified water or a solvent such as ethanol. The pulverization time may be about 4 hours to about 24 hours. The powders obtained by pulverization may be dried at a drying temperature of 100° C. to 200° C., preferably 120° C. to 140° C. for about 12 hours to about 36 hours. Thus, by carrying out the second calcination and pulverization, the main and subordinate components can be placed in a uniform state so that the dielectric porcelain composition here can be obtained in a uniform state at later production steps.

After mixing the powders obtained as described above with an organic binder based on, for instance, polyvinyl alcohol, acryl, and ethyl cellulose, the mixture is molded in a desired shape, followed by sintering by firing of the molded product. Molding may be carried out either in a wet mode such as a sheet process or printing, or in a dry mode such as press molding; appropriate selection may be from molding processes depending on the desired shape. Firing is preferably carried out in an oxygen atmosphere such as air, and the firing temperature must be lower than the melting point of Ag or an alloy containing Ag as a main component that forms a conductor that is used as an internal electrode, for instance, at 860° C. to 1,000° C., preferably 870° C. to 940° C.

A multilayer type device is fabricated of a multilayer ceramic substrate comprising a plurality of ceramic layers, each with a built-in dielectric device such as a capacitor or inductor. The multilayer ceramic substrate is fabricated by stacking and co-firing a plurality of green sheets of ceramic material having different dielectric characteristics while conductors as internal conductors are located at interfaces optionally with through-holes. By stacking a green sheet molded of the dielectric porcelain composition of the present invention on a green sheet molded of a general BaO-rare earth oxide-$TiO_2$ base dielectric porcelain composition known in the art, it is possible to fabricate a multilayer ceramic substrate using the dielectric porcelain composition of the present invention.

The present invention is now explained in more details with reference to specific examples.

EXPERIMENTAL EXAMPLE 1

Sample Preparation and How to Measure the Desired Physical Properties

Such various dielectric porcelain composition samples as set out in Table 1 were prepared in the following manners. The definitions of $\alpha$, $\beta$, x, y and z that specify the main component composition, a, b, c and d that specify the amounts of the subordinate components added, and R have been mentioned.

A basic production process is now explained specifically with reference to Sample No. 8 that is an inventive sample.

First, the starting materials for the main components $BaCO_3$, $Nd(OH)_3$ and $TiO_2$ were weighed such that x, y and z, i.e., the molar ratios of BaO, $Nd_2O_3$ and $TiO_2$ in the BaO—$Nd_2O_3$—$TiO_2$ base compound after calcination had such values as set out in the main component composition column of Sample No. 8 in Table 1, given later. That is, the starting materials were weighed such that x=18.5 (mol %), y=15.4 (mol %) and z=66.1 (mol %).

Purified water was added to the weighed starting materials at a slurry concentration of 25%, which were in turn wet mixed in a ball mill for 16 hours, followed by drying at 120° C. for 24 hours. The dried powders were calcined in air (1,200° C., 4 hours). Purified water was added to the BaO—Nd$_2$O$_3$—TiO$_2$ base compound after calcination at a slurry concentration of 25%, which was then pulverized in a ball mill for 16 hours, and thereafter dried at 120° C. for 24 hours to prepare BaO—Nd$_2$O$_3$—TiO$_2$ base compound powders.

Then, the remaining starting materials for the main components, that is, MgO and SiO$_2$ were weighed such that the number of moles of magnesium was twice as large as that of silicon. Purified water was added to them at a slurry concentration of 25%, which were wet mixed in a ball mill for 16 hours, followed by drying at 120° C. for 24 hours.

The dried powders were calcined in air (1,200° C., 3 hours). Purified water was added to the forsterite after calcination at a slurry concentration of 25%, which was in turn pulverized in a ball mill for 16 hours, and thereafter dried at 120° C. for 24 hours to prepare forsterite powders.

Next, ZnO, B$_2$O$_3$, CuO and BaCO$_3$ that were the raw materials for the subordinate components were at the ready.

Then, the pulverized BaO—Nd$_2$O$_3$—TiO$_2$ base compound powders and the pulverized forsterite powders were blended together at such mixing ratios as set out in Table 1, given later, and the subordinate components were blended with those main components at such blending ratios as set out at the amount-of-subordinate-component-added column of Sample No. 8 in Table 1 to obtain raw mixture powders. Specifically, weighing was done such that α=55 (vol %), β=45 (vol %), a=6.0 (wt %), b=4.5 (wt %), c=3.0 (wt %) and d=0.69 (wt %), purified water was added at a slurry concentration of 25%, a 16-hour wet mixing was carried out in a ball mill, and drying was performed at 120° C. for 24 hours to obtain the raw mixture powders.

The thus obtained raw mixture powders were again calcined in air (750° C., 2 hours) to obtain calcined powders.

Purified water was added to the resultant calcined powders in such a way as to provide a slurry concentration of 25%, which were again wet pulverized in a ball mill for 16 hours, and thereafter dried at 120° C. for 24 hours. An aqueous solution of polyvinyl alcohol was added as a binder to the re-pulverized powders for granulation, and the resulting granules were molded into a columnar shape of 12 mm in diameter and 6 mm in height. The molded column was fired at the temperature indicated at the firing temperature column of Sample No. 8 in Table 1, viz., 870° C. for 1 hour to obtain a dielectric porcelain composition.

The thus obtained dielectric porcelain composition was trimmed off at its surface to prepare a columnar pellet of 10 mm in diameter and 5 mm in height in the form of measuring Sample No. 8.

Dielectric porcelain composition Sample No. 8 was measured for a specific dielectric constant ∈r, a Q·f value and a temperature coefficient τf of resonance frequency pursuant to JIS R 1627 1996 (Testing Method for the Dielectric Characteristics of Fine Ceramics in Microwave Applications). Measurements were carried out at a frequency of 8.2 GHz, and resonance frequency was measured at a temperature ranging from −40° C. to 85° C. to work out the temperature coefficient τf of resonance frequency from the aforesaid calculation equation (1).

From the fact that each physical property could be measured as indicated in Table 1, Sample No. 8 is found to have been fully sintered at the low temperature of 870° C. Note here that each sample is found to have such physical properties as indicated by a specific dielectric constant of ∈r=25.2, a Q·f value of 4,957 (GHz) and a temperature coefficient of resonance frequency of τf=−2 (ppm/K).

Following the preparation process of such sample No. 8, such various samples as set out in Table 1 were prepared. At varied firing temperatures (850° C.-910° C.), to what degree a group of samples in a certain composition range could be sintered at low temperatures was found out (the samples with "unmeasurable" in Table 1 show that they are not sintered to a level at which dielectric characteristics can be measured). Samples that could be sintered were measured for the specific dielectric constant ∈r, the Q·f value (measured at a measuring frequency range of 7.6 to 8.2 GHz) and the temperature coefficient τf of resonance frequency.

The results are summed up in Table 1, given below. Note here that the asterisked (*) samples stand for comparative examples.

TABLE 1

| Sample No. | Main Component Composition | | | | | Amounts of Subordinate Components Added | | | |
|---|---|---|---|---|---|---|---|---|---|
| | α | β | x | y | z | a | b | c | d (R) |
| *1 | 55 | 45 | 18.5 | 15.4 | 66.1 | 6.0 | 4.5 | 3.0 | — |
| *2 | 55 | 45 | 18.5 | 15.4 | 66.1 | 6.0 | 4.5 | 3.0 | — |
| *3 | 55 | 45 | 18.5 | 15.4 | 66.1 | 6.0 | 4.5 | 3.0 | — |
| *4 | 55 | 45 | 18.5 | 15.4 | 66.1 | 6.0 | 4.5 | 3.0 | — |
| *5 | 55 | 45 | 18.5 | 15.4 | 66.1 | 6.0 | 4.5 | 3.0 | — |
| 6 | 55 | 45 | 18.5 | 15.4 | 66.1 | 6.0 | 4.5 | 3.0 | 0.69 (Ba) |
| 7 | 55 | 45 | 18.5 | 15.4 | 66.1 | 6.0 | 4.5 | 3.0 | 0.69 (Ba) |
| 8 | 55 | 45 | 18.5 | 15.4 | 66.1 | 6.0 | 4.5 | 3.0 | 0.69 (Ba) |
| 9 | 55 | 45 | 18.5 | 15.4 | 66.1 | 6.0 | 4.5 | 3.0 | 0.69 (Ba) |
| 10 | 55 | 45 | 18.5 | 15.4 | 66.1 | 6.0 | 4.5 | 3.0 | 0.69 (Ba) |
| 11 | 55 | 45 | 18.5 | 15.4 | 66.1 | 6.0 | 4.5 | 3.0 | 1.72 (Ba) |
| 12 | 55 | 45 | 18.5 | 15.4 | 66.1 | 6.0 | 4.5 | 3.0 | 1.72 (Ba) |
| 13 | 55 | 45 | 18.5 | 15.4 | 66.1 | 6.0 | 4.5 | 3.0 | 1.72 (Ba |
| 14 | 55 | 45 | 18.5 | 15.4 | 66.1 | 6.0 | 4.5 | 3.0 | 1.72 (Ba) |
| 15 | 55 | 45 | 18.5 | 15.4 | 66.1 | 6.0 | 4.5 | 3.0 | 1.72 (Ba) |
| 16 | 55 | 45 | 18.5 | 15.4 | 66.1 | 6.0 | 4.5 | 3.0 | 3.44 (Ba) |
| 17 | 55 | 45 | 18.5 | 15.4 | 66.1 | 6.0 | 4.5 | 3.0 | 3.44 (Ba) |
| 18 | 55 | 45 | 18.5 | 15.4 | 66.1 | 6.0 | 4.5 | 3.0 | 3.44 (Ba) |
| 19 | 55 | 45 | 18.5 | 15.4 | 66.1 | 6.0 | 4.5 | 3.0 | 3.44 (Ba) |
| 20 | 55 | 45 | 18.5 | 15.4 | 66.1 | 6.0 | 4.5 | 3.0 | 3.44 (Ba) |
| *21 | 55 | 45 | 18.5 | 15.4 | 66.1 | 6.0 | 4.5 | 3.0 | 5.16 (Ba) |
| *22 | 55 | 45 | 18.5 | 15.4 | 66.1 | 6.0 | 4.5 | 3.0 | 5.16 (Ba) |

| Sample No. | Firing Temp. (° C.) | Dielectric characteristics | | |
|---|---|---|---|---|
| | | ∈r | Q·f (GHz) | τf (ppm/k) |
| *1 | 850 | | unmeasurable | |
| *2 | 870 | | unmeasurable | |
| *3 | 880 | 25.4 | 5,044 | 2 |
| *4 | 890 | 25.9 | 4,998 | 1 |
| *5 | 910 | 26.9 | 4,982 | 0 |
| 6 | 850 | | unmeasurable | |
| 7 | 860 | | unmeasurable | |
| 8 | 870 | 25.2 | 4,957 | −2 |
| 9 | 890 | 27.0 | 4,901 | −2 |
| 10 | 910 | 27.7 | 4,843 | −3 |
| 11 | 850 | | unmeasurable | |
| 12 | 860 | 25.9 | 4,551 | −4 |
| 13 | 870 | 27.2 | 4,847 | −5 |
| 14 | 890 | 28.0 | 4,794 | −5 |
| 15 | 910 | 28.3 | 4,708 | −5 |
| 16 | 850 | 27.9 | 4,398 | −6 |
| 17 | 860 | 28.2 | 4,528 | −6 |
| 18 | 870 | 28.3 | 4,485 | −7 |
| 19 | 890 | 28.4 | 4,467 | −7 |
| 20 | 910 | 28.5 | 4,422 | −8 |
| *21 | 850 | 28.6 | 3,776 | −11 |
| *22 | 860 | 28.7 | 3,774 | −11 |

| Sample No. | Main Component Composition | | | | | Amounts of Subordinate Components Added | | | |
|---|---|---|---|---|---|---|---|---|---|
| | α | β | x | y | z | a | b | c | d (R) |
| 23 | 55 | 45 | 18.5 | 15.4 | 66.1 | 6.0 | 4.5 | 3.0 | 0.47 (Sr) |

TABLE 1-continued

| Sample No. | α | β | x | y | z | a | b | c | d (R) |
|---|---|---|---|---|---|---|---|---|---|
| 24 | 55 | 45 | 18.5 | 15.4 | 66.1 | 6.0 | 4.5 | 3.0 | 0.47 (Sr) |
| 25 | 55 | 45 | 18.5 | 15.4 | 66.1 | 6.0 | 4.5 | 3.0 | 0.47 (Sr) |
| 26 | 55 | 45 | 18.5 | 15.4 | 66.1 | 6.0 | 4.5 | 3.0 | 0.47 (Sr) |
| 27 | 55 | 45 | 18.5 | 15.4 | 66.1 | 6.0 | 4.5 | 3.0 | 0.47 (Sr) |
| 28 | 55 | 45 | 18.5 | 15.4 | 66.1 | 6.0 | 4.5 | 3.0 | 1.16 (Sr) |
| 29 | 55 | 45 | 18.5 | 15.4 | 66.1 | 6.0 | 4.5 | 3.0 | 1.16 (Sr) |
| 30 | 55 | 45 | 18.5 | 15.4 | 66.1 | 6.0 | 4.5 | 3.0 | 1.16 (Sr) |
| 31 | 55 | 45 | 18.5 | 15.4 | 66.1 | 6.0 | 4.5 | 3.0 | 1.16 (Sr) |
| 32 | 55 | 45 | 18.5 | 15.4 | 66.1 | 6.0 | 4.5 | 3.0 | 1.16 (Sr) |
| 33 | 55 | 45 | 18.5 | 15.4 | 66.1 | 6.0 | 4.5 | 3.0 | 2.33 (Sr) |
| 34 | 55 | 45 | 18.5 | 15.4 | 66.1 | 6.0 | 4.5 | 3.0 | 2.33 (Sr) |
| 35 | 55 | 45 | 18.5 | 15.4 | 66.1 | 6.0 | 4.5 | 3.0 | 2.33 (Sr |
| 36 | 55 | 45 | 18.5 | 15.4 | 66.1 | 6.0 | 4.5 | 3.0 | 2.33 (Sr) |
| 37 | 55 | 45 | 18.5 | 15.4 | 66.1 | 6.0 | 4.5 | 3.0 | 2.33 (Sr) |
| 38 | 55 | 45 | 18.5 | 15.4 | 66.1 | 6.0 | 4.5 | 3.0 | 0.25 (Ca) |
| 39 | 55 | 45 | 18.5 | 15.4 | 66.1 | 6.0 | 4.5 | 3.0 | 0.25 (Ca) |
| 40 | 55 | 45 | 18.5 | 15.4 | 66.1 | 6.0 | 4.5 | 3.0 | 0.25 (Ca) |
| 41 | 55 | 45 | 18.5 | 15.4 | 66.1 | 6.0 | 4.5 | 3.0 | 0.25 (Ca) |
| 42 | 55 | 45 | 18.5 | 15.4 | 66.1 | 6.0 | 4.5 | 3.0 | 0.25 (Ca) |

| | Firing | Dielectric characteristics | | |
|---|---|---|---|---|
| Sample No. | Temp. (° C.) | εr | Q · f (GHz) | τf (ppm/k) |
| 23 | 850 | | unmeasurable | |
| 24 | 860 | | unmeasurable | |
| 25 | 870 | 25.5 | 4,812 | 2 |
| 26 | 890 | 27.3 | 4,877 | 2 |
| 27 | 910 | 27.8 | 4,820 | 2 |
| 28 | 850 | | unmeasurable | |
| 29 | 860 | 27.0 | 4,628 | 6 |
| 30 | 870 | 28.1 | 4,773 | 5 |
| 31 | 890 | 28.6 | 4,711 | 5 |
| 32 | 910 | 28.9 | 4,650 | 5 |
| 33 | 850 | 28.5 | 4,199 | 9 |
| 34 | 860 | 29.0 | 4,393 | 9 |
| 35 | 870 | 29.2 | 4,423 | 8 |
| 36 | 890 | 29.3 | 4,376 | 8 |
| 37 | 910 | 29.4 | 4,389 | 8 |
| 38 | 850 | | unmeasurable | |
| 39 | 860 | | unmeasurable | |
| 40 | 870 | 26.6 | 4,800 | 1 |
| 41 | 890 | 28.3 | 4,834 | 1 |
| 42 | 910 | 28.8 | 4,795 | 1 |

| Sample No. | α | β | x | y | z | a | b | c | d (R) |
|---|---|---|---|---|---|---|---|---|---|
| 43 | 55 | 45 | 18.5 | 15.4 | 66.1 | 6.0 | 4.5 | 3.0 | 0.63 (Ca) |
| 44 | 55 | 45 | 18.5 | 15.4 | 66.1 | 6.0 | 4.5 | 3.0 | 0.63 (Ca) |
| 45 | 55 | 45 | 18.5 | 15.4 | 66.1 | 6.0 | 4.5 | 3.0 | 0.63 (Ca) |
| 46 | 55 | 45 | 18.5 | 15.4 | 66.1 | 6.0 | 4.5 | 3.0 | 0.63 (Ca) |
| 47 | 55 | 45 | 18.5 | 15.4 | 66.1 | 6.0 | 4.5 | 3.0 | 0.63 (Ca) |
| 48 | 55 | 45 | 18.5 | 15.4 | 66.1 | 6.0 | 4.5 | 3.0 | 1.26 (Ca) |
| 49 | 55 | 45 | 18.5 | 15.4 | 66.1 | 6.0 | 4.5 | 3.0 | 1.26 (Ca) |
| 50 | 55 | 45 | 18.5 | 15.4 | 66.1 | 6.0 | 4.5 | 3.0 | 1.26 (Ca) |
| 51 | 55 | 45 | 18.5 | 15.4 | 66.1 | 6.0 | 4.5 | 3.0 | 1.26 (Ca) |
| 52 | 55 | 45 | 18.5 | 15.4 | 66.1 | 6.0 | 4.5 | 3.0 | 1.26 (Ca) |

| | Firing | Dielectric characteristics | | |
|---|---|---|---|---|
| Sample No. | Temp. (° C.) | εr | Q · f (GHz) | τf (ppm/k) |
| 43 | 850 | | unmeasurable | |
| 44 | 860 | 28.0 | 4,577 | 4 |
| 45 | 870 | 29.2 | 4,698 | 3 |
| 46 | 890 | 29.4 | 4,642 | 3 |
| 47 | 910 | 29.5 | 4,605 | 3 |
| 48 | 850 | 29.0 | 4,123 | 10 |
| 49 | 860 | 29.5 | 4,251 | 10 |
| 50 | 870 | 29.6 | 4,247 | 9 |
| 51 | 890 | 29.7 | 4,258 | 9 |
| 52 | 910 | 29.7 | 4,271 | 9 |

*comparative example

The advantages of the present invention would be evident from the results of Table 1. As the firing temperature of 880° C. in Sample No. *3 (comparative example) is taken as a comparative criterion value, then the incorporation of the given amount of the alkaline earth metal oxide as one subordinate component in the present invention enables the firing temperature to be brought down to 870° C. (Sample No. 8), 860° C. (Sample No. 12), 850° C. (Sample No. 16), 870° C. (Sample No. 25), 860° C. (Sample No. 29), 850° C. (Sample No. 33), 870° C. (Sample No. 40), 860° C. (Sample No. 44), and 850° C. (Sample No. 48).

With Sample No. *21 (comparative) and Sample No. *22 (comparative), there is a problem that although the firing temperature can somehow be reduced down to 850° C. or 860° C., yet too much alkaline earth metal oxide causes the Q·f value to fall short of 4,000 GHz, resulting in an increased dielectric loss.

EXPERIMENTAL EXAMPLE 2

Sample Preparation and How to Measure the Desired Physical Properties

Such various dielectric porcelain composition samples as set out in Table 2 were prepared as in Experimental Example 1.

As can be seen from Table 2, while the values of α, β, x, y and z specifying the main component composition and the values of a, b and c indicative of the amounts of the subordinate components added were varied, experiments were carried out to study the influences of such parameters. Note here that Ca was used as the alkaline earth metal R in a constant amount of 0.63 wt %.

The results are summed up in Table 2, given below. Throughout Table 2, the value of the firing temperature (° C.) is 870(° C.).

TABLE 2

| Sample No. | α | β | x | y | z | a | b | c | d (R) |
|---|---|---|---|---|---|---|---|---|---|
| *53 | 5 | 95 | 18.5 | 15.4 | 66.1 | 6.0 | 4.5 | 3.0 | 0.63 (Ca) |
| 54 | 15 | 85 | 18.5 | 15.4 | 66.1 | 6.0 | 4.5 | 3.0 | 0.63 (Ca) |
| 55 | 25 | 75 | 18.5 | 15.4 | 66.1 | 6.0 | 4.5 | 3.0 | 0.63 (Ca) |
| 56 | 35 | 65 | 18.5 | 15.4 | 66.1 | 6.0 | 4.5 | 3.0 | 0.63 (Ca) |
| 57 | 45 | 55 | 18.5 | 15.4 | 66.1 | 6.0 | 4.5 | 3.0 | 0.63 (Ca) |
| 58 | 65 | 35 | 18.5 | 15.4 | 66.1 | 6.0 | 4.5 | 3.0 | 0.63 (Ca) |
| 59 | 75 | 25 | 18.5 | 15.4 | 66.1 | 6.0 | 4.5 | 3.0 | 0.63 (Ca) |
| *60 | 85 | 15 | 18.5 | 15.4 | 66.1 | 6.0 | 4.5 | 3.0 | 0.63 (Ca) |
| *61 | 55 | 45 | 6.7 | 26.7 | 66.6 | 6.0 | 4.5 | 3.0 | 0.63 (Ca) |
| 62 | 55 | 45 | 11.7 | 21.7 | 66.6 | 6.0 | 4.5 | 3.0 | 0.63 (Ca) |
| 63 | 55 | 45 | 16.7 | 16.7 | 66.6 | 6.0 | 4.5 | 3.0 | 0.63 (Ca) |
| *64 | 55 | 45 | 23.7 | 12.7 | 63.6 | 6.0 | 4.5 | 3.0 | 0.63 (Ca) |
| *65 | 55 | 45 | 18.7 | 7.7 | 73.6 | 6.0 | 4.5 | 3.0 | 0.63 (Ca |
| 66 | 55 | 45 | 16.7 | 15.7 | 67.6 | 6.0 | 4.5 | 3.0 | 0.63 (Ca) |
| 67 | 55 | 45 | 16.7 | 18.7 | 64.6 | 6.0 | 4.5 | 3.0 | 0.63 (Ca) |
| *68 | 55 | 45 | 16.7 | 30.7 | 52.6 | 6.0 | 4.5 | 3.0 | 0.63 (Ca) |
| *69 | 55 | 45 | 16.7 | 26.7 | 56.6 | 6.0 | 4.5 | 3.0 | 0.63 (Ca) |
| 70 | 55 | 45 | 16.5 | 21.5 | 62.0 | 6.0 | 4.5 | 3.0 | 0.63 (Ca) |
| 71 | 55 | 45 | 18.7 | 11.7 | 69.6 | 6.0 | 4.5 | 3.0 | 0.63 (Ca) |
| *72 | 55 | 45 | 11.7 | 11.7 | 76.6 | 6.0 | 4.5 | 3.0 | 0.63 (Ca) |

| | Firing | Dielectric characteristics | | |
|---|---|---|---|---|
| Sample No. | Temp. (° C.) | εr | Q · f (GHz) | τf (ppm/k) |
| *53 | 870 | 9.9 | 7,428 | −41 |
| 54 | 870 | 10.9 | 7,159 | −35 |
| 55 | 870 | 14.3 | 6,488 | −27 |
| 56 | 870 | 18.3 | 5,961 | −18 |
| 57 | 870 | 22.5 | 5,408 | −7 |
| 58 | 870 | 38.8 | 4,644 | 17 |

TABLE 2-continued

| Sample No. | Firing Temp. (°C.) | εr | Q·f (GHz) | τf (ppm/k) |
|---|---|---|---|---|
| 59 | 870 | 49.8 | 4,474 | 35 |
| *60 | 870 | 57.6 | 4,316 | 47 |
| *61 | 870 | 21.1 | 2,998 | −21 |
| 62 | 870 | 23.7 | 4,010 | −35 |
| 63 | 870 | 27.9 | 6,082 | −33 |
| *64 | 870 | | unmeasurable | |
| *65 | 870 | 31.7 | 2,856 | 18 |
| 66 | 870 | 28.3 | 6,172 | −9 |
| 67 | 870 | 25.4 | 5,342 | −24 |
| *68 | 870 | 19.4 | 2,753 | −37 |
| *69 | 870 | 19.5 | 2,982 | −35 |
| 70 | 870 | 21.3 | 5,025 | −31 |
| 71 | 870 | 27.0 | 6,838 | 5 |
| *72 | 870 | | unmeasurable | |

| Sample No. | Main Component Composition | | | | | Amounts of Subordinate Components Added | | | |
|---|---|---|---|---|---|---|---|---|---|
| | α | β | x | y | z | a | b | c | d (R) |
| *73 | 55 | 45 | 18.5 | 15.4 | 66.1 | 0.05 | 4.5 | 3.0 | 0.63 (Ca) |
| 74 | 55 | 45 | 18.5 | 15.4 | 66.1 | 0.5 | 4.5 | 3.0 | 0.63 (Ca) |
| 75 | 55 | 45 | 18.5 | 15.4 | 66.1 | 3.0 | 4.5 | 3.0 | 0.63 (Ca) |
| 76 | 55 | 45 | 18.5 | 15.4 | 66.1 | 9.0 | 4.5 | 3.0 | 0.63 (Ca) |
| *77 | 55 | 45 | 18.5 | 15.4 | 66.1 | 16.0 | 4.5 | 3.0 | 0.63 (Ca) |
| *78 | 55 | 45 | 18.5 | 15.4 | 66.1 | 6.0 | 0.05 | 3.0 | 0.63 (Ca) |
| 79 | 55 | 45 | 18.5 | 15.4 | 66.1 | 6.0 | 0.5 | 3.0 | 0.63 (Ca) |
| 80 | 55 | 45 | 18.5 | 15.4 | 66.1 | 6.0 | 3.0 | 3.0 | 0.63 (Ca) |
| 81 | 55 | 45 | 18.5 | 15.4 | 66.1 | 6.0 | 9.0 | 3.0 | 0.63 (Ca) |
| *82 | 55 | 45 | 18.5 | 15.4 | 66.1 | 6.0 | 16.0 | 3.0 | 0.63 (Ca) |
| *83 | 55 | 45 | 18.5 | 15.4 | 66.1 | 6.0 | 4.5 | 0.05 | 0.63 (Ca) |
| 84 | 55 | 45 | 18.5 | 15.4 | 66.1 | 6.0 | 4.5 | 0.5 | 0.63 (Ca) |
| 85 | 55 | 45 | 18.5 | 15.4 | 66.1 | 6.0 | 4.5 | 1.5 | 0.63 (Ca |
| 86 | 55 | 45 | 18.5 | 15.4 | 66.1 | 6.0 | 4.5 | 6.0 | 0.63 (Ca) |
| *87 | 55 | 45 | 18.5 | 15.4 | 66.1 | 6.0 | 4.5 | 12.0 | 0.63 (Ca) |

| Sample No. | Firing Temp. (°C.) | εr | Q·f (GHz) | τf (ppm/k) |
|---|---|---|---|---|
| *73 | 870 | | unmeasurable | |
| 74 | 870 | 27.4 | 4,812 | 8 |
| 75 | 870 | 29.3 | 4,887 | 6 |
| 76 | 870 | 28.5 | 4,752 | 0 |
| *77 | 870 | 27.0 | 3,604 | −6 |
| *78 | 870 | | unmeasurable | |
| 79 | 870 | 27.3 | 4,597 | 7 |
| 80 | 870 | 29.3 | 5,163 | 5 |
| 81 | 870 | 24.2 | 4,522 | 1 |
| *82 | 870 | 19.5 | 3,370 | −2 |
| *83 | 870 | | unmeasurable | |
| 84 | 870 | 28.3 | 4,848 | 5 |
| 85 | 870 | 29.2 | 5,068 | 3 |
| 86 | 870 | 28.2 | 4,671 | −4 |
| *87 | 870 | 27.4 | 3,055 | −13 |

*comparative example
** comparative example

The advantages of the present invention would be evident from the results given above. That is, the present invention provides a dielectric porcelain composition that contains as main components BaO, $Nd_2O_3$, $TiO_2$, MgO and $SiO_2$ at the given ratios and as subordinate components ZnO, $B_2O_3$ and CuO at the given ratios, and further comprises an alkaline earth metal oxide RO (R: an alkaline earth metal oxide) as an additional subordinate component. It is thus possible to obtain a dielectric porcelain composition having low-temperature sintering capability stable and reliable enough to permit a conductor formed of Ag, an alloy containing Ag as a main component or the like to be used as an internal conductor. It is also possible to obtain a dielectric porcelain composition that has limited resonance frequency changes with temperature changes and a specific dielectric constant lower than that of a BaO-rare earth oxide-$TiO_2$ base dielectric porcelain composition, and so is suitable for multilayer type device formation.

EXPERIMENTAL EXAMPLE 3

Next, experimentation was carried out to ascertain what influences the addition of Ag as an optional subordinate component has on low-temperature sintering capability. That is, experimentation was carried out using a subordinate component composition for the dielectric porcelain composition, which comprised ZnO, $B_2O_3$, CuO and an alkaline earth metal oxide RO (R: an alkaline earth metal oxide) and further containing Ag. Consequently, it has been found that low-temperature firing capability can be further improved by the addition of Ag.

Sample Preparation and How to Measure the Desired Physical Properties

Dielectric porcelain composition samples were prepared in the following manners. The definitions of α, β, x, y and z that specify the main component composition, a, b, c and d that specify the amounts of the subordinate components added R have already been mentioned along with those of e and R.

First, the starting materials for the main components $BaCO_3$, $Nd(OH)_3$ and $TiO_2$ were weighed such that x, y and z, i.e., the molar ratios of BaO, $Nd_2O_3$ and $TiO_2$ in the BaO—$Nd_2O_3$—$TiO_2$ base compound after calcination had such values as given below. That is, the starting materials were weighed such that x=18.5 (mol %), y=15.4 (mol %) and z=66.1 (mol %).

Purified water was added to the weighed starting materials at a slurry concentration of 25%, which were in turn wet mixed in a ball mill for 16 hours, followed by drying at 120° C. for 24 hours. The dried powders were calcined in air (1,200° C., 4 hours). Purified water was added to the BaO—$Nd_2O_3$—$TiO_2$ base compound after calcination at a slurry concentration of 25%, which was then pulverized in a ball mill for 16 hours, and thereafter dried at 120° C. for 24 hours to prepare BaO—$Nd_2O_3$—$TiO_2$ base compound powders.

Then, the remaining starting materials for the main components, that is, MgO and $SiO_2$ were weighed such that the number of moles of magnesium was twice as large as that of silicon. Purified water was added to them at a slurry concentration of 25%, which were wet mixed in a ball mill for 16 hours, followed by drying at 120° C. for 24 hours.

The dried powders were calcined in air (1,200° C., 3 hours). Purified water was added to the forsterite after calcination at a slurry concentration of 25%, which was in turn pulverized in a ball mill for 16 hours, and thereafter dried at 120° C. for 24 hours to prepare forsterite powders.

Next, ZnO, $B_2O_3$, CuO and $CaCO_3$ that were the raw materials for the subordinate components were at the ready.

Then, the pulverized BaO—$Nd_2O_3$—$TiO_2$ base compound powders and the pulverized forsterite powders were blended together such that their mixing ratio were α=55% by volume and β=45% by volume, and the subordinate components with the ratio represented by aZnO, $bB_2O_3$, cCuO and dCaO were weighed such that the ratio to the main component composition was a=6.0% by weight, b=2.0% by weight, c=3.0% by weight and d=0.6% by weight. Purified water was added to the blend at a slurry concentration of 25%, which was then wet mixed in a ball mill for 16 hours, and thereafter dried at 120° C. for 24 hours to obtain a raw mixture powder material.

The thus obtained raw mixture powders were again calcined in air (750° C., 2 hours) to obtain calcined powders.

Ethanol was added to the resultant calcined powders in such a way as to provide a slurry concentration of 25%, which were again wet pulverized in a ball mill for 16 hours. At this time, the optional subordinate component metal Ag was added such that its content relative to the main components in the fired product was 1.0% by weight, and 2.0% by weight. Thus, a total of three samples (inclusive of the one having an Ag content of 0% by weight) were prepared, and thereafter dried at 100° C. for 24 hours.

An acrylic resin binder, a dispersant, a plasticizer and toluene as an organic solvent were added to the thus obtained post-drying dielectric powders, and they were then mixed together in a ball mill to prepare a dielectric paste. Then, this dielectric paste was used to form a 70 μm-thick green sheet on a PET film.

A green sheet multilayer sample for measuring heat shrinkage behavior was prepared by stacking and pressing together a plurality of green sheets, each peeled off the PET film, to prepare a green substrate, and then cutting that green sheet into a given size (1.20 mm in length, 4.0 mm in width and 2.0 mm in thickness).

Figure 6A:
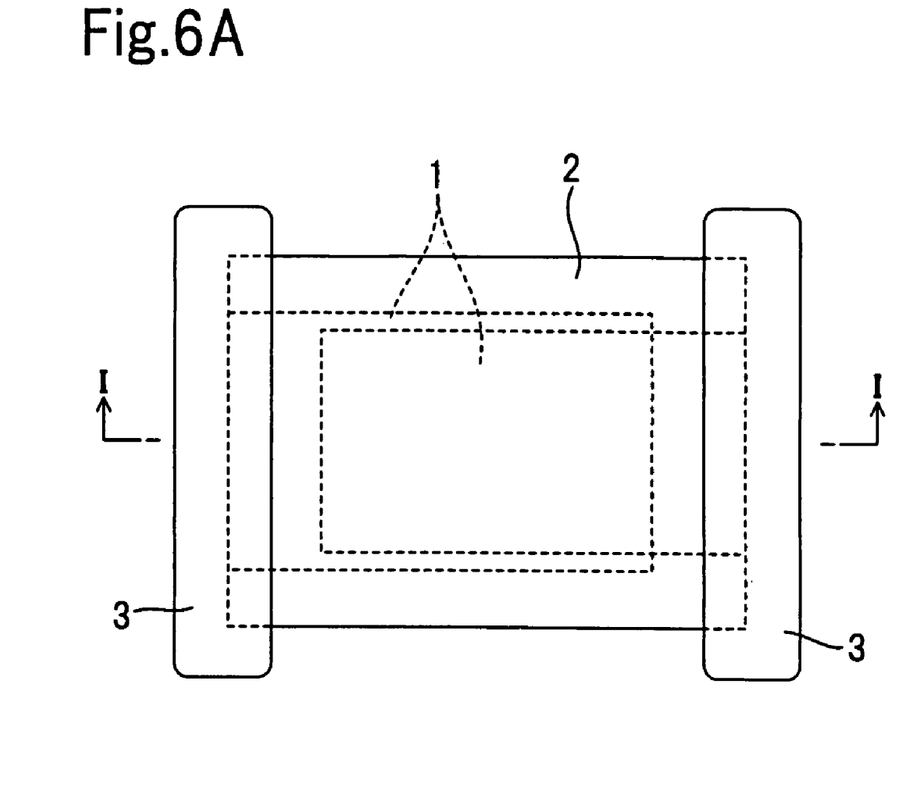
FIG. 6(A) is a plane view of one exemplary chip capacitor.
Figure 6B:
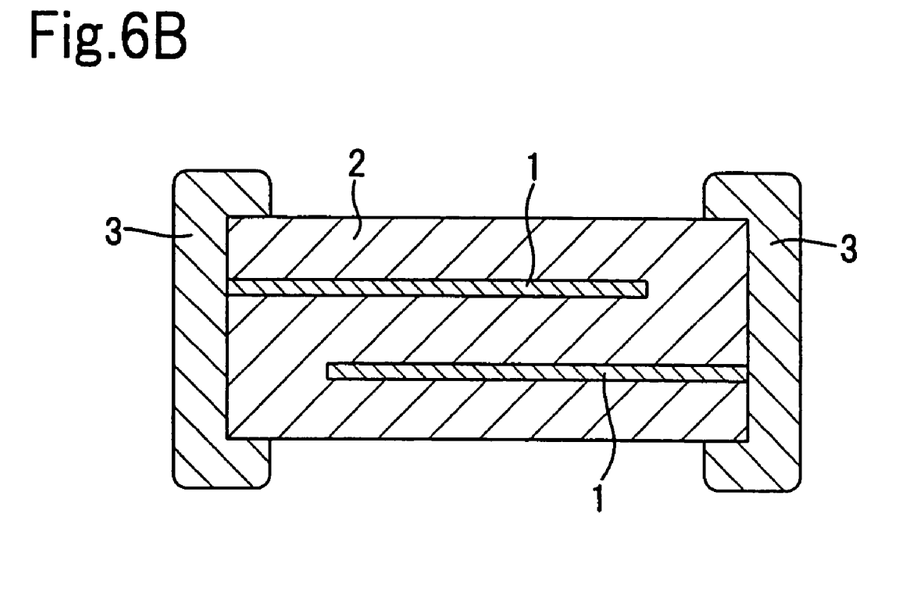
FIG. 6(B) is a sectional view of the chip capacitor of FIG. 6(A) as taken on line I-I.

Then, a chip capacitor was prepared as a sample for measuring capacitance and insulation resistance. That is, after an Ag electrode paste was printed on the aforesaid green sheet, the green sheet was peeled off the PET film. Then, such green sheets and a protective green sheet (with no Ag electrode paste printed on it) were stacked and pressed together. Two sheets, each with an Ag electrode, were stacked one upon another. Then, the stack was cut into a given size to obtain a green chip, which was then subjected to binder burnout treatment and firing. Following this, Ag terminal electrodes ware formed to obtain a chip capacitor. FIGS. 6(A) and 6(B) are illustrative in schematic of the thus completed chip capacitor. In FIG. 6, reference numeral 1 stands for an Ag internal electrode, 2 a dielectric layer, and 3 an Ag terminal electrode.

The sample for measurement of heat shrinkage behaviors and the chip capacitor estimation sample, each prepared in the above ways, were used to make estimations of (1) heat shrinkage behaviors, and chip capacitor (in terms of capacitance Cp and insulation resistance IR) in the following manners.

(1) Heat Shrinkage Behavior

Using a thermo-mechanical analyzer (TMA4000S made by MAC Science Co., Ltd.), heat shrinkage was measured under the conditions of room temperature to 1,000° C. and a heating rate of 10° C./min.

Figure 3:
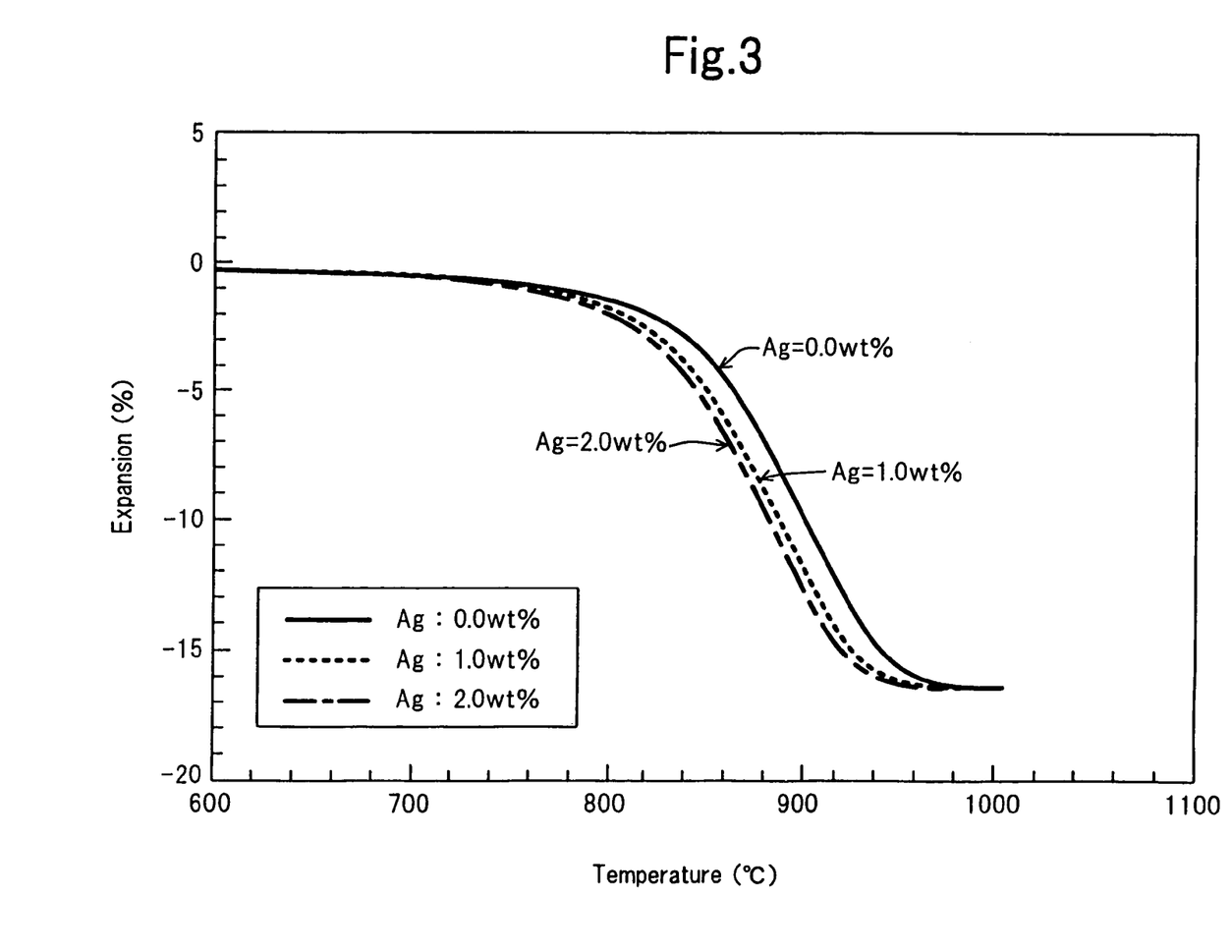
FIG. 3 is graphically representative of heat shrinkage behaviors (temperature vs. shrinkage factor relations upon sample heating) for each amount of Ag added.

FIG. 3 is graphically representative of measuring temperature vs. shrinkage factor (negative expansion factor) relations, showing that at an increasing Ag content of 1.0 wt % and 2.0 wt %, the graph shifts a lot more to a low temperature side than at the Ag content of 0 wt %; further improvements in low-temperature firing capability are achievable by the addition of Ag.

(2) Chip Capacitor Estimation (Measurement of Capacitance Cp and Insulation Resistance IR)

For measurements, chip capacitors obtained by firing at the firing temperatures of 860° C., 880° C. and 900° C. were used.

Measurement of Capacitance Cp

Using Precision LCR meter (4284A made by Hewlett-Packard Co., Ltd.), capacitance Cp was measured under the conditions of a frequency of 1 kHz and an input signal level (measuring voltage) of 1 Vrms. Note here that measurement counts were 15 per each.

Figure 4A:
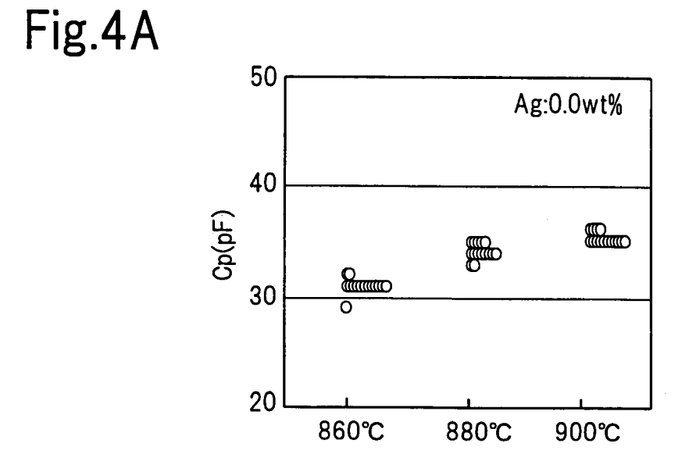
FIGS. 4(A) to (C) are representative of the results of measurement of capacitance Cp at given firing temperatures.
Figure 4B:
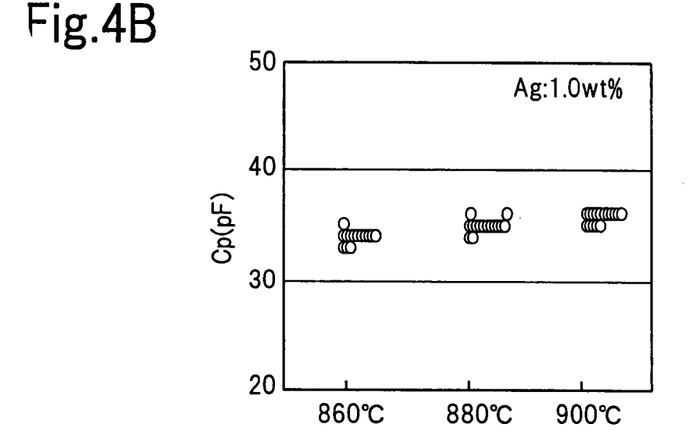
Figure 4C:
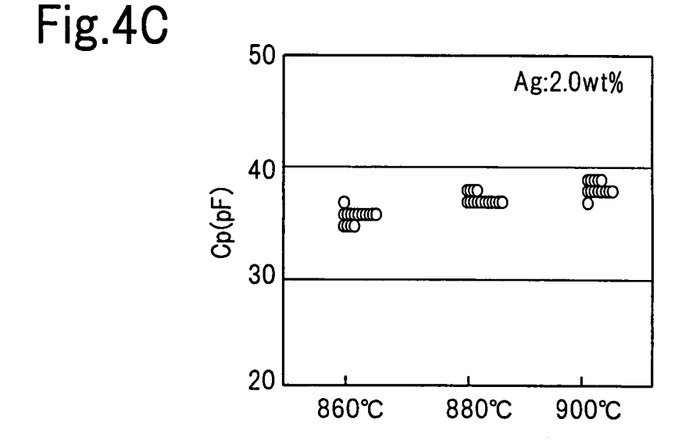

FIGS. 4(A) to 4(C) are representative of the results of measurement, from which the capacitance Cp is found to be increased by the addition of Ag. As shown in Table 3 given below, this results from ∈r increases due to the addition of Ag.

Measurement of Insulation Resistance IR

Using a digital insulation meter (DSM-8103 made by Toa Denpa Kogyo Co., Ltd.), insulation resistance IR after a 30-second application of DC 50 V was measured. Measurement counts were 5 per each.

Figure 5A:
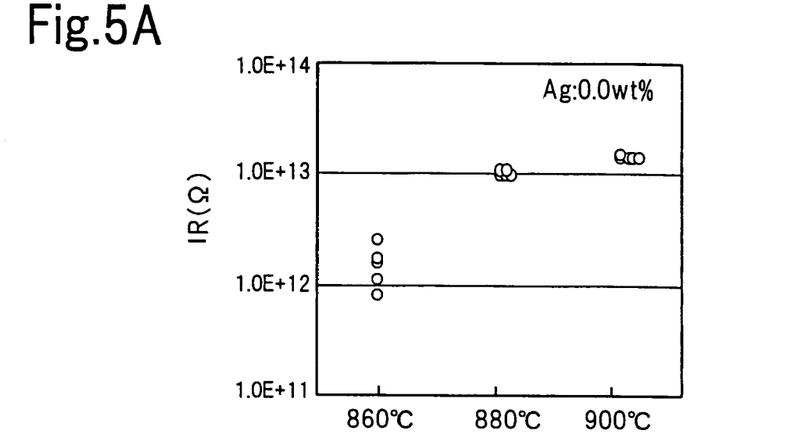
FIGS. 5(A) to (C) are representative of the results of measurement of insulation resistance IR at given firing temperatures.
Figure 5B:
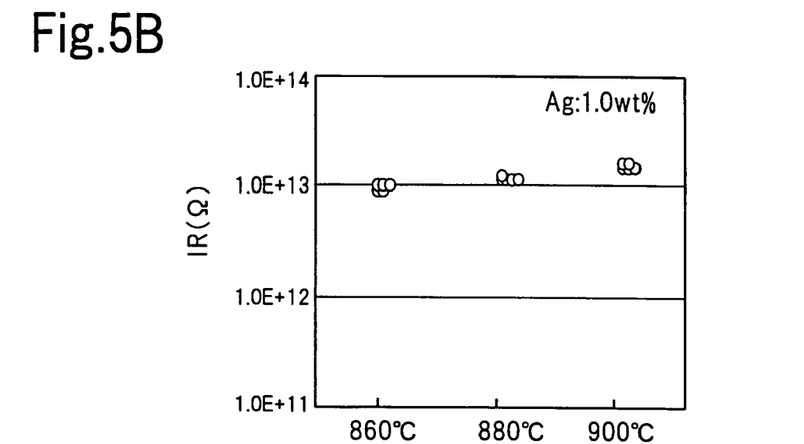
Figure 5C:
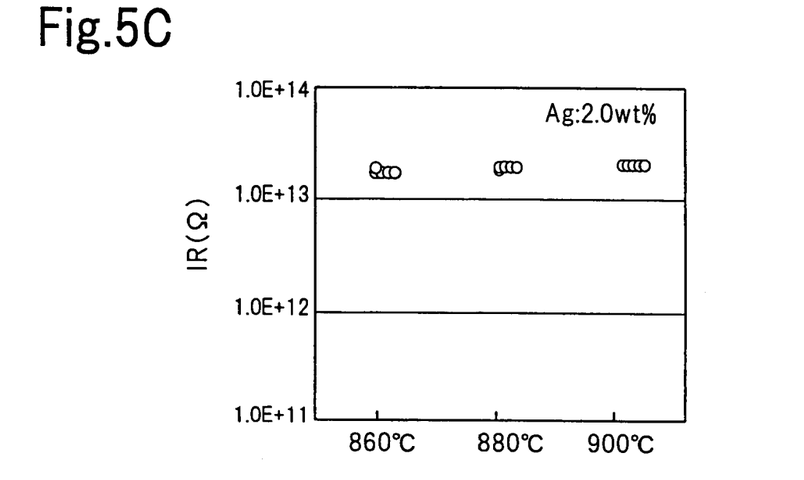

The results of measurement were plotted in FIGS. 5(A) to 5(C), showing that firing can be carried out at an even lower temperature by the addition of Ag so that an IR value of at least 1.0E+13Ω can be obtained at firing temperatures of 860° C. or higher.

Further, from the results of measurement of dielectric characteristics (∈r, Q·f value and τf), as set out in Table 3 given below, it is found that there are no significant differences between the samples comprising the subordinate components ZnO, $B_2O_3$, CuO and CaO, and the samples comprising those subordinate components plus Ag. However, there are increases observed in the capacitance (Cp) and the insulation resistance (IR), as shown in Table 4.

It is noted that symbols ◉ and ○ for capacitance (Cp) and insulation resistance (IR) are indicative of the results of measurement read from FIGS. 4 and 5: ◉ indicates that the sample has a much less variable yet high value enough to meet the objects of the present invention, and ○ indicates that the sample has a value that is within the range of the present invention but slightly inferior to ◉.

As already noted, the specific dielectric constant ∈r, the Q·f value and the temperature coefficient τf of resonance frequency were measured pursuant to JIS R 1627 1996 (Testing Method for the Dielectric Characteristics of Fine Ceramics in Microwave Applications). The measurements were obtained at a measuring frequency of 7.4 to 7.8 GHz, the resonance frequency was measured in the temperature range of −40 to 85° C., and the temperature coefficient τf of resonance frequency was worked out from the aforesaid calculation equation (1).

TABLE 3

| Sample | Main Component Composition | | | | | Amounts of Subordinate Components Added | | | | |
| --- | --- | --- | --- | --- | --- | --- | --- | --- | --- | --- |
| No. | α | β | x | y | z | a | b | c | d(R) | e |
| 88 | 55 | 45 | 18.5 | 15.4 | 66.1 | 6.0 | 2.0 | 3.0 | 0.60(Ca) | — |
| 89 | 55 | 45 | 18.5 | 15.4 | 66.1 | 6.0 | 2.0 | 3.0 | 0.60(Ca) | 1.0 |
| 90 | 55 | 45 | 18.5 | 15.4 | 66.1 | 6.0 | 2.0 | 3.0 | 0.60(Ca) | 2.0 |

| | Firing | Dielectric characteristics | | |
| --- | --- | --- | --- | --- |
| Sample No. | Temp. (° C.) | ∈r | Q·f (GHz) | τf (ppm/k) |
| 88 | 860 | 29.4 | 5,281 | 5 |
| 89 | 860 | 31.4 | 5,166 | 15 |
| 90 | 860 | 32.8 | 4,876 | 20 |

TABLE 4

| Sample No. | Electrostatic Capacity (Cp) | Dielectric Resistance (IR) |
| --- | --- | --- |
| 88 | ○ | ○ |
| 89 | ◉ | ◉ |
| 89 | ◉ | ◉ |

POSSIBLE INDUSTRIAL APPLICATIONS

The dielectric porcelain composition of the present invention could find wide applications in electronic parts industries.

What we claim is:

1. A dielectric porcelain composition, characterized by containing as a main component composition a component represented by a composition formula $\{\alpha(xBaO \cdot yNd_2O_3 \cdot zTiO_2) + \beta(2MgO \cdot SiO_2)\}$ wherein x, y and z indicative of a molar ratio of BaO, $Nd_2O_3$, and $TiO_2$ are in ranges of $$9 \text{ (mol \%)} \leq x \leq 22 \text{ (mol \%)}$$

$$9 \text{ (mol \%)} \leq y \leq 29 \text{ (mol \%)}$$

$$61 \text{ (mol \%)} \leq z \leq 74 \text{ (mol \%)}$$

and have a relation of x+y+z=100 (mol %), and $\alpha$ and $\beta$ indicative of a volume ratio of each component in said main component composition are in ranges of $$15 \text{ (vol \%)} \leq \alpha \leq 75 \text{ (vol \%)}$$

$$25 \text{ (vol \%)} \leq \beta \leq 85 \text{ (vol \%)}$$

and have a relation of $\alpha+\beta=100$ (vol %), wherein a zinc oxide, a boron oxide, a copper oxide and an alkaline earth metal oxide are contained as subordinate components relative to said main component composition, and when said subordinate components are represented by aZnO, $bB_2O_3$, cCuO and dRO (R is an alkaline earth metal), a, b, c and d indicative of a weight ratio of each subordinate component relative to said main component composition have relations of $$0.1 \text{ (wt \%)} \leq a \leq 12.0 \text{ (wt \%)}$$

$$0.1 \text{ (wt \%)} \leq b \leq 12.0 \text{ (wt \%)}$$

$$0.1 \text{ (wt \%)} \leq c \leq 9.0 \text{ (wt \%)}$$

$$0.2 \text{ (wt \%)} \leq d \leq 5.0 \text{ (wt \%)}$$

and wherein dielectric porcelain composition further contains Ag as an additional subordinate component.

2. The dielectric porcelain composition according to claim 1, wherein said alkaline earth metal R is at least one selected from the group consisting of Ba, Sr and Ca.

3. The dielectric porcelain composition according to claim 1, which contains a forsterite ($2MgO \cdot SiO_2$) crystal.

4. The dielectric porcelain composition according to claim 1, wherein the weight ratio e of Ag relative to said main component composition is:

$$0.3 \text{ (wt \%)} \leq e \leq 3.0 \text{ (wt \%)}.$$

5. The dielectric porcelain composition according to claim 1, which has such a physical property as represented by a firing temperature of up to 870° C.

6. The dielectric porcelain composition according to claim 1, which has such a physical property as represented by a specific dielectric constant of up to 50.

7. The dielectric porcelain composition according to claim 1, which has such physical properties as represented by a specific dielectric constant of 20 to 40 and a Q·f value of at least 4,000 GHz.

8. A process for producing a dielectric porcelain composition according to claim 1, comprising firing a mixture comprising a barium-containing raw material, a neodymium-containing raw material, a titanium-containing raw material, a magnesium-containing raw material, a silicon-containing raw material, a zinc-containing raw material, a boron-containing raw material, a copper-containing raw material and an alkaline earth metal-containing raw material and silver (Ag), wherein:

forsterite ($2MgO \cdot SiO_2$) powders are used as said magnesium-containing raw material and said silicon-containing raw material.

* * * * *